(12) United States Patent
Lim

(10) Patent No.: US 9,985,298 B2
(45) Date of Patent: May 29, 2018

(54) ACTIVATION APPARATUS OF FUEL CELL STACK

(71) Applicant: HYUNDAI MOTOR COMPANY, Seoul (KR)

(72) Inventor: Junhong Lim, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 415 days.

(21) Appl. No.: 14/799,474

(22) Filed: Jul. 14, 2015

(65) Prior Publication Data

US 2016/0164130 A1   Jun. 9, 2016

(30) Foreign Application Priority Data

Dec. 8, 2014   (KR) .......................... 10-2014-0175099

(51) Int. Cl.
*H01M 4/64* (2006.01)
*H01M 8/00* (2016.01)
*H01M 8/04082* (2016.01)

(52) U.S. Cl.
CPC .......... *H01M 8/00* (2013.01); *H01M 8/04201* (2013.01)

(58) Field of Classification Search
CPC ......... H01M 8/04201; H01M 8/04392; H01M 8/04552; H01M 8/04559; H01M 8/04679; H01M 8/04753; H01M 2008/1095; H01M 2250/20; Y02T 90/32
USPC ....................................................... 429/535
See application file for complete search history.

(56) References Cited

FOREIGN PATENT DOCUMENTS

| JP | 2003-151613 A | 5/2003 |
|---|---|---|
| JP | 2010-061831 A | 3/2010 |
| JP | 2010061831 A * | 3/2010 |
| JP | 4978469 B2 | 7/2012 |
| KR | 10-0666782 B1 | 1/2007 |
| KR | 10-2011-0053118 A | 5/2011 |
| KR | 10-2012-0078824 | 7/2012 |

* cited by examiner

*Primary Examiner* — Gary Harris
(74) *Attorney, Agent, or Firm* — McDermott Will & Emery LLP

(57) ABSTRACT

An activation apparatus of fuel cell stacks, which automatically performs activation and performance evaluation processes on the fuel cell stacks when the fuel cell stacks have entered a frame, includes i) a connector connection assembly configured to connect a plurality of connector probes to cell terminals of the fuel cell stack, ii) an output cable connection assembly configured to connect positive (+) output cables to the first side of the fuel cell stack, and iii) a fluid supply pipe connection assembly configured to connect negative (−) output cables to the second side of the fuel cell stack and to connect a fluid supply pipe to the manifold of the fuel cell stack.

25 Claims, 16 Drawing Sheets

(a)

(b)

(a)

(b)

(a)

(b)

ACTIVATION APPARATUS OF FUEL CELL STACK

CROSS-REFERENCE TO RELATED APPLICATION

This application claims the benefit of priority to Korean Patent Application No. 10-2014-0175099 filed in the Korean Intellectual Property Office on Dec. 8, 2014, the entire content of which is incorporated herein by reference.

TECHNICAL FIELD

An exemplary embodiment of the present inventive concept relates to an activation system of a fuel cell stack. More particularly, the present inventive concept relates to an activation apparatus of a fuel cell stack which is capable of automatically implementing activation and performance evaluation processes for a fuel cell stack.

BACKGROUND

In general, a fuel cell includes an electrode for generating an electrochemical reaction with a fuel and an oxidizer, a polymer electrolyte membrane for transferring protons generated by the reaction, and a separator (commonly called a "separation plate" in the industry) for supporting the electrode and the polymer electrolyte membrane.

A polymer electrolyte fuel cell has been most spotlighted as a fuel cell for a vehicle. The polymer electrolyte fuel cell has advantages in that it has high efficiency and high current density and output density, it has a short starting time, it does not corrode, and it does not need to control an electrolyte because it uses a polymer electrolyte, compared to other types of fuel cells.

Furthermore, in the global vehicle industry, active research is being carried out on polymer electrolyte fuel cells because the polymer electrolyte fuel is an environmentally-friendly power source that discharges only water as exhaust gas.

This polymer electrolyte fuel cell can generate electrical energy while generating water and heat through an electrochemical reaction between fuel, including hydrogen, and an oxidizer, such as air.

That is, in the polymer electrolyte fuel cell, supplied fuel is separated into protons and electrons in the catalyst of the anode, and the separated protons are transferred to the cathode through a polymer electrolyte membrane. In this case, the separated protons are combined with a supplied oxidizer and electrons received through an external conductor, thereby generating electrical energy while generating water.

In an actual fuel cell for a vehicle, in order to obtain high potential, unit cells are stacked according to the required potential. The stacked unit cells are called a stack.

The electrode of a fuel cell includes a mixture of hydrogen ion carriers and a catalyst. In an initial operation after a fuel cell is fabricated, the activity of electrochemical reactions may be low.

The reason for this is that reactants are unable to reach the catalyst because the moving path of the reactants is clogged, the hydrogen ion carriers forming a triple phase interface are not easily hydrolyzed in the initial operation, and it is difficult to secure the continuous mobility of hydrogen ions and electrons.

For this reason, in order to secure maximum performance of fuel cells after the fuel cells are assembled in a fuel cell stack, that is, an electrical generation aggregate of the fuel cells which includes a membrane-electrode assembly including an electrode and a polymer electrolyte membrane and a separator, an activation and performance evaluation procedure needs to be performed on the fuel cells.

An object of the activation and performance evaluation is to remove remaining impurities that have flowed in a process of manufacturing a membrane-electrode assembly and a fuel cell stack, activate sites that do not participate in a reaction, secure a moving passage in which reactants may move to a catalyst, and secure a hydrogen ion passage by sufficiently hydrolyzing an electrolyte included in the polymer electrolyte membrane and an electrode. The activation of fuel cells is performed in various ways according to fuel cell manufacturers, but a major activation method is a long-time operation at a specific voltage.

After a stack of a plurality of fuel cells is fabricated, conventional equipment for activating fuel cells may perform activation and performance evaluation processes on the fuel cell stack by supplying fuel and an oxidizer to the fuel cells, applying electrical energy generated from the fuel cells to an electronic load device, and checking cell voltages.

In the activation and performance evaluation process of the fuel cell stack, the connectors of voltage measurement equipment are connected to terminals respectively protruded from the fuel cells of the fuel cell stack, an output cable connected to an electronic load device is connected to the output terminals of the fuel cell stack on both sides, and a fluid supply pipe for supplying fluids (e.g., hydrogen, air, and a coolant) to the fuel cells of the fuel cell stack is connected to the manifold of the fuel cell stack.

In the process of connecting the connectors of the voltage measurement equipment to the respective terminals protruded from the fuel cells of the fuel cell stack, the connectors and the terminals of the fuel cells are manually connected. Accordingly, in a conventional art, since the connectors of the voltage measurement equipment are manually connected to the terminals of the fuel cells of the fuel cell stack, workability may be low, a task time taken to connect the connectors and the terminals may be excessively consumed, and the fuel cell stack may be damaged when the connectors are connected to the terminals.

Furthermore, in the process of connecting the output cable, connected to the electronic load device, to the output terminals of the fuel cell stack on both sides, a worker engages a bus bar and the output cable, connected to the electronic load device, with the output terminals of the fuel cell stack using bolts. Accordingly, in a conventional art, a worker may be exposed to a danger of electric shock if he or she manually connects and disconnects the output cable to and from the output terminals of the fuel cell stack. That is, although the supply of hydrogen and air to the fuel cell stack is stopped, an electric current is generated due to an electrochemical reaction of hydrogen and air that remains in the fuel cell stack. Accordingly, a worker may experience an electric shock accident when separating the output cable from the output terminals.

Furthermore, in the process of connecting the fluid supply pipe for supplying a fluid to the fuel cells of the fuel cell stack to the manifold of the fuel cell stack, the fuel cell stack is manually pushed and connected to the fluid supply pipe of the activation equipment. Accordingly, in a conventional art, since the fuel cell stack of several tens of kilograms is manually pushed and connected to the fluid supply pipe of the activation equipment, workability is deteriorated. Furthermore, it is difficult to secure air-tightness between the fluid supply pipe and the manifold of the fuel cell stack when they are connected.

The above information disclosed in this Background section is only for the enhancement of understanding of the background of the inventive concept and therefore it may contain information that does not form the prior art that is already known in this country to a person of ordinary skill in the art.

SUMMARY OF THE DISCLOSURE

The present disclosure has been made in an effort to provide the activation apparatus of fuel cell stacks having an advantage of handling an automatic assembly mass-production process for a fuel cell vehicle by automatically implementing activation and performance evaluation processes for fuel cell stacks in a multiple channel way.

Furthermore, exemplary embodiments of the present inventive concept provide the activation apparatus of fuel cell stacks having an advantage of automatically connecting a voltage measurement connector, an output cable, and a fluid supply pipe for fuel cell stacks simultaneously.

An exemplary embodiment of the present inventive concept provides the activation apparatus of fuel cell stacks for automatically performing activation and performance evaluation processes on the fuel cell stacks in a state in which the fuel cell stacks have entered a frame. The activation apparatus of fuel cell stacks may include i) a connector connection assembly installed in the frame in an electric-powered manner in such a way so as to reciprocate in the entry direction of the fuel cell stack and configured to connect a plurality of connector probes to cell terminals of the fuel cell stack, ii) an output cable connection assembly installed in the frame in an electric-powered manner in such a way so as to reciprocate in a direction lateral to a first side of the fuel cell stack and configured to connect positive (+) output cables to the first side of the fuel cell stack, and iii) a fluid supply pipe connection assembly installed in the frame in an electric-powered manner in such a way so as to reciprocate in a direction lateral to a second side of the fuel cell stack and configured to connect negative (−) output cables to the second side of the fuel cell stack and to connect a fluid supply pipe to the manifold of the fuel cell stack.

The activation apparatus in accordance with an exemplary embodiment of the present inventive concept may automatically perform the activation and performance evaluation processes on at least two fuel cell stacks disposed in at least two channels after the fuel cell stacks are transferred through a carrier and an external appearance test is performed on the fuel cell stacks.

In the activation apparatus of fuel cell stacks in accordance with an exemplary embodiment of the present inventive concept, a plurality of the activation apparatuses may be spaced apart from each other with a transfer path of the fuel cell stacks interposed between the activation apparatuses and disposed in two channels.

The activation apparatus of fuel cell stacks in accordance with an exemplary embodiment of the present inventive concept may automatically connect cell voltage measurement equipment and the cell terminals of the fuel cell stack through the connector connection assembly, may automatically connect the output cables of electronic load equipment to the output terminals of the fuel cell stack through the output cable connection assembly and the fluid supply pipe connection assembly, and may automatically connect the fluid supply pipe of fluid supply equipment to the manifold of the fuel cell stack through the fluid supply pipe connection assembly.

The activation apparatus of fuel cell stacks in accordance with an exemplary embodiment of the present inventive concept may supply hydrogen and air to the unit cells of the fuel cell stack through the fluid supply pipe, may apply electrical energy generated by the unit cells to the electronic load equipment through the output cable, and may measure the cell voltages of the unit cells applied to the electronic load equipment using the cell voltage measurement equipment.

In the activation apparatus of fuel cell stacks in accordance with an exemplary embodiment of the present inventive concept, the connector connection assembly may include a first movable body installed in the frame in such a way so as to reciprocate in the entry direction of the fuel cell stack through a first actuator, a proximity sensor installed in the frame and configured to limit the movement location of the first movable body, a terminal guide installed in the first movable body in such a way so as to reciprocate with respect to the cell terminals of the fuel cell stack and configured to support the cell terminals, and a connection unit configured to include connector probes connected to the cell terminals arranged in the terminal guide and installed in the first movable body in such a way so as to reciprocate.

In the activation apparatus of fuel cell stacks in accordance with an exemplary embodiment of the present inventive concept, the terminal guide may include a guide block installed in the first movable body in such a way so as to be reciprocated by a second actuator in the entry direction of the fuel cell stack.

In the activation apparatus of fuel cell stacks in accordance with an exemplary embodiment of the present inventive concept, the "V"-shaped grooves for supporting the cell terminals may be formed in the guide block.

In the activation apparatus of fuel cell stacks in accordance with an exemplary embodiment of the present inventive concept, insertion grooves into which the cell terminals are respectively inserted may be formed in the support grooves.

In the activation apparatus of fuel cell stacks in accordance with an exemplary embodiment of the present inventive concept, the guide block may be installed to the connection stage of the second actuator in such a way so as to move through the first guide bar.

In the activation apparatus of fuel cell stacks in accordance with an exemplary embodiment of the present inventive concept, a buffer spring for buffering support pressure on the cell terminals may be installed in the first guide bar between the guide block and the connection stage of the second actuator.

In the activation apparatus of fuel cell stacks in accordance with an exemplary embodiment of the present inventive concept, a first rod cell for detecting a contact with the connection stage of the second actuator may be installed in the guide block.

In the activation apparatus of fuel cell stacks in accordance with an exemplary embodiment of the present inventive concept, the connection unit may include a probe block installed in the first movable body in such a way so as to reciprocate up and down through a third actuator.

In the activation apparatus of fuel cell stacks in accordance with an exemplary embodiment of the present inventive concept, the connector probes brought in contact with the cell terminals may be consecutively arranged in the probe block.

In the activation apparatus of fuel cell stacks in accordance with an exemplary embodiment of the present inventive concept, the probe block may include mounting holes each having a greater inside diameter than the outside diameter of the connector probe, and a pair of fixed plates for supporting each of the connector probes may be installed in the probe block through the mounting hole.

In the activation apparatus of fuel cell stacks in accordance with an exemplary embodiment of the present inventive concept, a ring member may be fixedly installed in the connector probe.

In the activation apparatus of fuel cell stacks in accordance with an exemplary embodiment of the present inventive concept, the ring member may be spaced apart from the fixed plates at a specific interval and disposed between the fixed plates.

In the activation apparatus of fuel cell stacks in accordance with an exemplary embodiment of the present inventive concept, each of the connector probes may include an outer shell member installed in the probe block, a probe pin installed within the outer shell member in such a way so as to move up and down, a return spring installed in the outer shell member and configured to apply an elastic force to the probe pin, and a connector head installed in the probe pin and configured to come in contact with each of the cell terminals and to have a "V"-shaped head groove supporting the cell terminal.

In the activation apparatus of fuel cell stacks in accordance with an exemplary embodiment of the present inventive concept, the output cable connection assembly may include a second movable body installed in the frame in such a way so as to reciprocate in the direction lateral to the side face on the first side of the fuel cell stack direction through a fourth actuator, and a pair of first connection terminal sets elastically installed in the second movable body and connected to the positive (+) output terminals of the fuel cell stack.

In the activation apparatus of fuel cell stacks in accordance with an exemplary embodiment of the present inventive concept, a pair of attachments for supporting the side face on the first side of the fuel cell stack may be installed in the second movable body.

In the activation apparatus of fuel cell stacks in accordance with an exemplary embodiment of the present inventive concept, each of the first connection terminal sets may include a first cable connection member fixedly installed in the second movable body and connected to electronic load equipment through the positive (+) output cables, a first terminal rod protruded from the inside of the first cable connection member to the outside, installed in such a way so as to move in the direction lateral to the side face on the first side of the fuel cell stack, and configured to have a first connection terminal installed at the protruded end of the first terminal rod, and a first spring installed within the first cable connection member and configured to apply an elastic force to the first terminal rod.

In the activation apparatus of fuel cell stacks in accordance with an exemplary embodiment of the present inventive concept, the first connection terminal may be inserted into each of terminal holes provided in the side face on the first side of the fuel cell stack and configured to form an outer circumference of a tapered shape.

In the activation apparatus of fuel cell stacks in accordance with an exemplary embodiment of the present inventive concept, the fourth actuator may include an actuation cylinder connected to the second movable body.

In the activation apparatus of fuel cell stacks in accordance with an exemplary embodiment of the present inventive concept, the second movable body may be installed in the frame in such a way so as to reciprocate through a pair of second guide bars.

In the activation apparatus of fuel cell stacks in accordance with an exemplary embodiment of the present inventive concept, the pair of second guide bars may be inserted into a pair of first support blocks provided in the frame and configured to guide a movement of the second movable body.

In the activation apparatus of fuel cell stacks in accordance with an exemplary embodiment of the present inventive concept, the fluid supply pipe connection assembly may include a third movable body installed in the frame in such a way so as to reciprocate in the direction lateral to the second side of the fuel cell stack through a fifth actuator, a pair of second connection terminal sets elastically installed in the third movable body and connected to the negative (−) output terminals of the fuel cell stack, and a plurality of pipe connection assemblies provided in the third movable body and connected to the fluid supply pipe of fluid supply equipment.

In the activation apparatus of fuel cell stacks in accordance with an exemplary embodiment of the present inventive concept, each of the second connection terminal sets may include a second cable connection member fixedly installed in the third movable body and connected to electronic load equipment through the negative (−) output cables, a second terminal rod protruded from the inside of the second cable connection member to the outside, installed in such a way so as to move in the direction lateral to the second side of the fuel cell stack, and configured to have a second connection terminal installed at the protruded end of the second terminal rod, and a second spring installed within the second cable connection member and configured to apply an elastic force to the second terminal rod.

In the activation apparatus of fuel cell stacks in accordance with an exemplary embodiment of the present inventive concept, the second connection terminal may be inserted into each of terminal holes provided in a side face on the second side of the fuel cell stack and configured to form an outer circumference of a tapered shape.

In the activation apparatus of fuel cell stacks in accordance with an exemplary embodiment of the present inventive concept, the third movable body may be installed in the frame in such a way so as to reciprocate through a pair of third guide bars.

In the activation apparatus of fuel cell stacks in accordance with an exemplary embodiment of the present inventive concept, the third guide bars may be inserted into a pair of second support blocks provided on the frame.

In the activation apparatus of fuel cell stacks in accordance with an exemplary embodiment of the present inventive concept, movable blocks reciprocated by the fifth actuator in the direction lateral to the second side of the fuel cell stack may be installed in the frame.

In the activation apparatus of fuel cell stacks in accordance with an exemplary embodiment of the present inventive concept, stoppers may be respectively formed on both sides of the movable blocks in such a way so as to be protruded.

In the activation apparatus of fuel cell stacks in accordance with an exemplary embodiment of the present inventive concept, stopping blocks engaged with the stoppers may be respectively installed in the third guide bars.

In the activation apparatus of fuel cell stacks in accordance with an exemplary embodiment of the present inventive concept, a fixing block may be fixedly installed in the movable blocks.

In the activation apparatus of fuel cell stacks in accordance with an exemplary embodiment of the present inventive concept, a second rod cell brought in contact with the fixing block may be installed in the third movable body.

In the activation apparatus of fuel cell stacks in accordance with an exemplary embodiment of the present inventive concept, the fluid supply pipe connection assembly may further include an air-tightness test unit configured to testing air-tightness of the fuel cell stack.

In the activation apparatus of fuel cell stacks in accordance with an exemplary embodiment of the present inventive concept, the air-tightness test unit may include an air supply source configured to supply air to the pipe connection assembly, a pneumatic regulator configured to control pressure of the air supplied to the pipe connection assembly, a flowmeter configured to measure a flow rate of the supplied air, and a pressure sensor configured to detect pressure of air which acts within the fuel cell stack.

The activation apparatus of fuel cell stacks in accordance with an exemplary embodiment of the present inventive concept may further include cell voltage measurement equipment electrically connected to the connector connection assembly and configured to test the average cell voltage of the fuel cell stack, and display means connected to the cell voltage measurement equipment and configured to receive a control signal from a controller based on the average cell voltage of the fuel cell stack and to display whether the fuel cell stack is normal.

In the activation apparatus of fuel cell stacks in accordance with an exemplary embodiment of the present inventive concept, the connector connection assembly may include a display electrically connected to the connector probes and the terminal guides and configured to externally display electrical connection with the cell terminals and the connector probes.

In the activation apparatus of fuel cell stacks in accordance with an exemplary embodiment of the present inventive concept, the display may include an LED bulb configured to emit light in response to an electrical signal.

In accordance with exemplary embodiments of the present inventive concept, activation and performance evaluation processes for fuel cell stacks can be unmanned and automatically implemented through the connector connection assembly, the output cable connection assembly, and the fluid supply pipe connection assembly in a multiple channel manner.

Furthermore, in an exemplary embodiment of the present inventive concept, an automatic assembly mass-production process for a fuel cell vehicle can be flexibly handled because the voltage measurement connector, the output cable, and the fluid supply pipe for fuel cell stacks are not connected manually, but are connected simultaneously through an automation process.

In addition, in an exemplary embodiment of the present inventive concept, since activation and performance evaluation processes for fuel cell stacks are automatically performed, workability can be improved, damage to a fuel cell stack and an electric shock accident of a worker can be prevented, and air-tightness between the fluid supply pipe and the manifold of a fuel cell stack can be secured when a fluid is supplied.

BRIEF DESCRIPTION OF THE DRAWINGS

Reference is made to the following drawings in order to describe exemplary embodiments of the present inventive concept, and thus the technical spirit of the present inventive concept should not be construed as being limited to the accompanying drawings.

DETAILED DESCRIPTION

Figure 1:
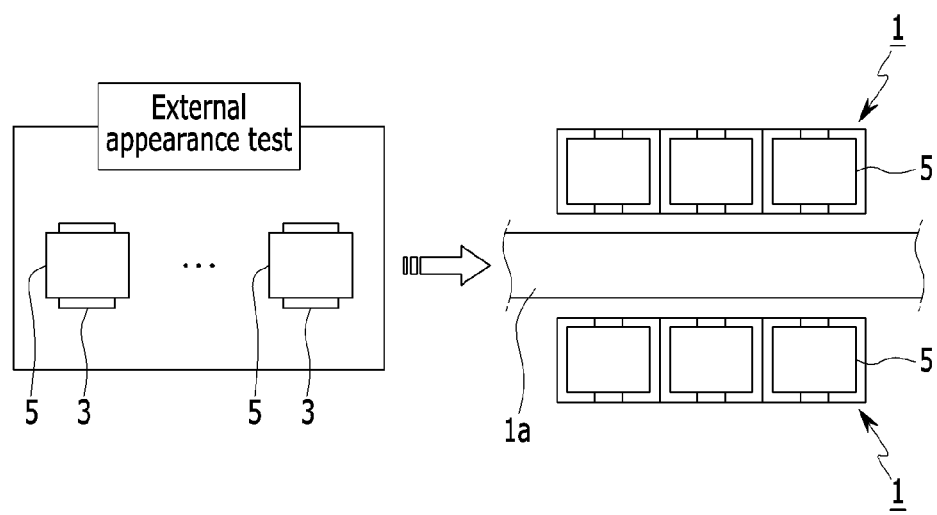
FIG. 1 is a block diagram schematically illustrating a process of activating fuel cell stacks to which the activation apparatus of fuel cell stacks in accordance with an exemplary embodiment of the present inventive concept has been applied.

Hereinafter, the present inventive concept will be described more fully with reference to the accompanying drawings, in which exemplary embodiments of the inventive concept are illustrated. As those skilled in the art would realize, the described embodiments may be modified in various different ways, all without departing from the spirit or scope of the present inventive concept.

In order to clearly describe the present inventive concept, a description of parts not related to the description is omitted, and the same reference numbers are used throughout the drawings to refer to the same or like parts.

Furthermore, the size and thickness of each of the elements illustrated in the drawings are arbitrarily illustrated for ease of description, and the present inventive concept is not limited thereto. In the drawings, the thicknesses of parts and regions have been enlarged for clarity.

Furthermore, in the following detailed description, the reason why terms, such as the first and the second, are used is to distinguish between elements because the first and the second respectively have the same constructions, and thus the elements are not limited to such order in the following description.

In the entire specification, in addition, unless explicitly described to the contrary, the word "comprise" and variations such as "comprises" or "comprising" will be understood to imply the inclusion of stated elements but not the exclusion of any other elements.

Furthermore, each of terms, such as " . . . unit," " . . . means," " . . . part," and " . . . member," described in the specification, means a unit of a comprehensive element that performs at least one function or operation.

FIG. 1 is a block diagram schematically illustrating a process of activating fuel cell stacks to which the activation apparatus of fuel cell stacks in accordance with an exemplary embodiment of the present inventive concept has been applied.

Referring to FIG. 1, the activation apparatus 1 of fuel cell stacks in accordance with an exemplary embodiment of the present inventive concept is used to secure performance of a fuel cell stack 5 in which a plurality of fuel cells (hereinafter called "unit cells") have been stacked. That is, the activation apparatus 1 of fuel cell stacks is used for the activation and performance evaluation of unit cells that form the fuel cell stack 5.

For example, the activation apparatus 1 of fuel cell stacks may perform activation and performance evaluation processes on a membrane-electrode assembly in such a way so as to supply hydrogen, air, and a coolant to unit cells and to apply a specific voltage from a unit cell to an electronic load.

More specifically, the activation apparatus 1 of fuel cell stacks may supply hydrogen, air, and a coolant to the unit cells of the fuel cell stack 5 and apply electrical energy, generated by an electrochemical reaction of hydrogen and air from the unit cells, to electronic load equipment through an output cable.

Furthermore, the activation apparatus 1 of fuel cell stacks may measure the cell voltages of unit cells, applied to the electronic load equipment, through cell voltage measurement equipment, and may check whether the fuel cell stack is normal.

The activation and performance evaluation processes for the fuel cell stack 5 to which the activation apparatus 1 of fuel cell stacks has been applied are performed after the fuel cell stack 5 is fabricated.

The activation and performance evaluation processes for the fuel cell stack 5 to which the activation apparatus 1 of fuel cell stacks has been applied are described in detail below. First, in an exemplary embodiment of the present inventive concept, an external appearance of the fuel cell stack 5 transferred through a carrier 3 is tested.

After the external appearance of the fuel cell stack 5 is tested, the fuel cell stack 5 is transferred to the activation apparatus 1 of fuel cell stacks in accordance with an exemplary embodiment of the present inventive concept. The activation and performance evaluation processes are automatically performed on the fuel cell stack 5 through the activation apparatus 1.

In this case, the activation apparatuses 1 of a fuel cell stack in accordance with an exemplary embodiment of the present inventive concept may be disposed in two channels in the activation and performance evaluation processes for the fuel cell stack 5. That is, a plurality of the activation apparatuses 1 of a fuel cell stack in accordance with an exemplary embodiment of the present inventive concept may be separated from each other and disposed in two channels with a transfer path 1a of the fuel cell stack 5 interposed therebetween.

The activation apparatus 1 of fuel cell stacks in accordance with an exemplary embodiment of the present inventive concept is configured to automatically implement the activation and performance evaluation processes for the fuel cell stack 5 in a multiple channel manner.

That is, exemplary embodiments of the present inventive concept provide the activation apparatus 1 of fuel cell stacks, which is capable of automatically connecting a voltage measurement connector, an output cable, and a fluid supply pipe for the fuel cell stack 5 simultaneously.

Figure 2A:
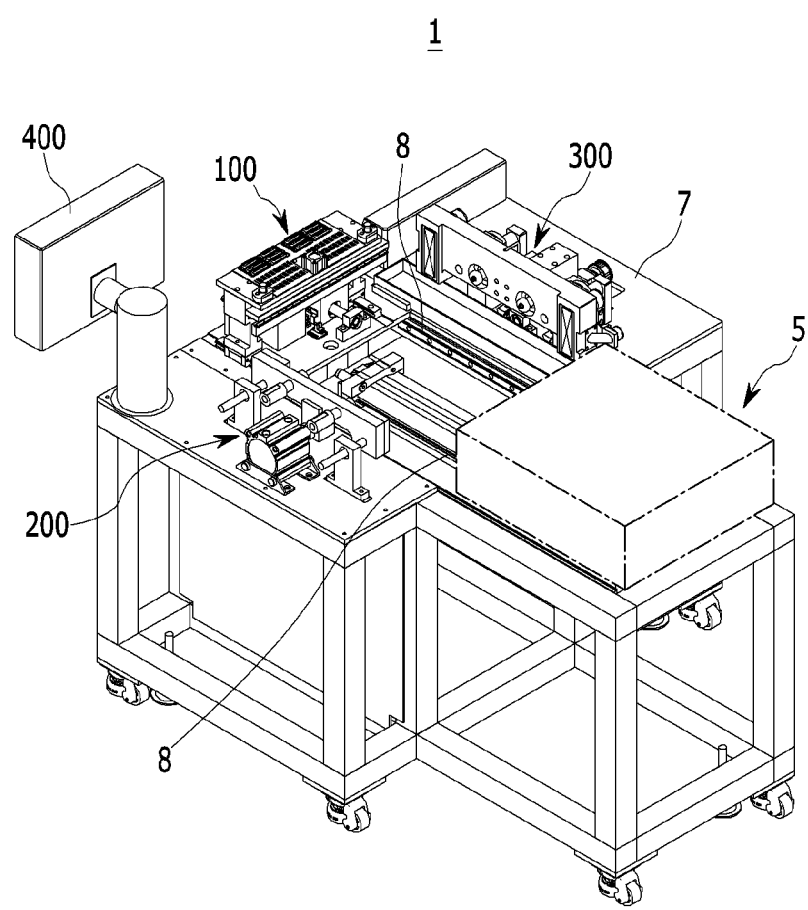
FIG. 2A is a perspective view illustrating the activation apparatus of fuel cell stacks in accordance with an exemplary embodiment of the present inventive concept.
Figure 2B:
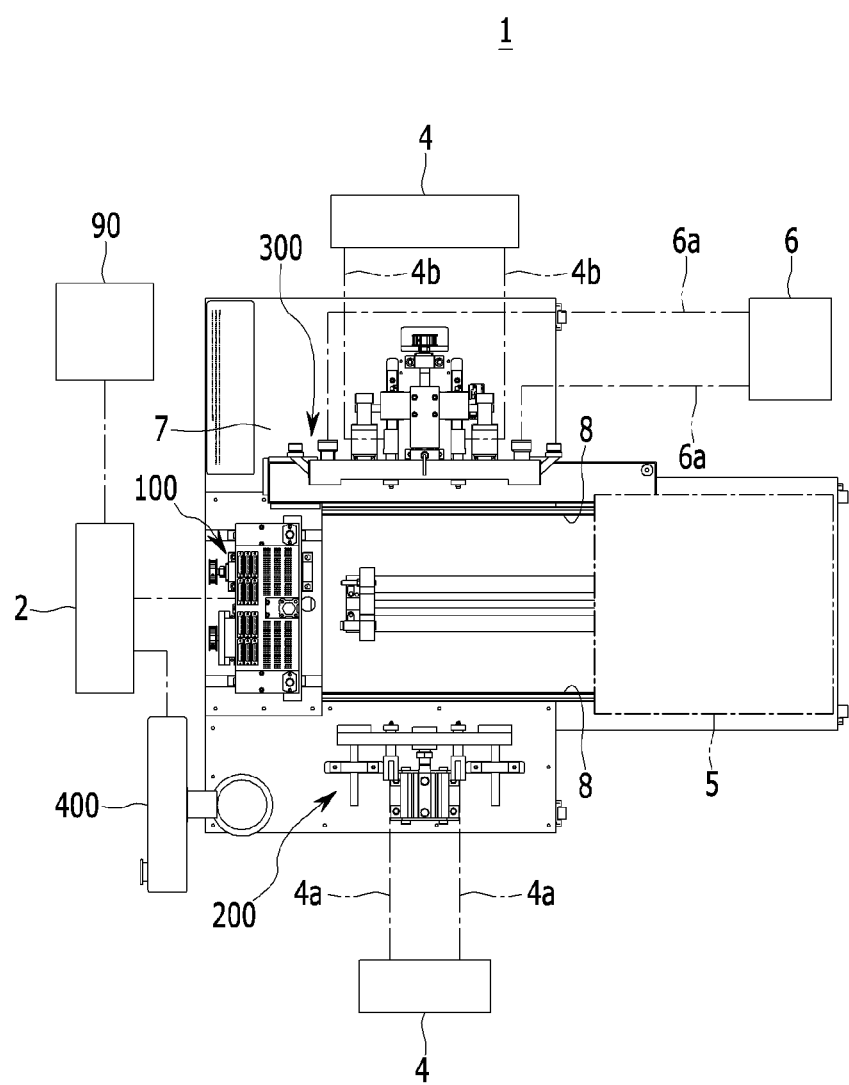
FIG. 2B is a schematic plan view illustrating the activation apparatus of fuel cell stacks in accordance with an exemplary embodiment of the present inventive concept.

FIG. 2A is a perspective view illustrating the activation apparatus of fuel cell stacks in accordance with an exemplary embodiment of the present inventive concept, and FIG. 2B is a schematic plan view illustrating the activation apparatus of fuel cell stacks in accordance with an exemplary embodiment of the present inventive concept.

Referring to FIGS. 2A and 2B, the activation apparatus 1 of fuel cell stacks in accordance with an exemplary embodiment of the present inventive concept may basically include a frame 7, an connector connection assembly 100, an output cable connection assembly 200, and a fluid supply pipe connection assembly 300.

The frame 7 is used to support various constituent elements to be described below, and may be formed of a single frame or a frame segmented into two or more frames.

The frame 7 may include various attached elements for supporting the constituent elements, such as various brackets, bars, rods, plates, housings, cases, blocks, barrier ribs, ribs, rails, and collars.

The various attached elements are used to install the constituent elements to be described in more detail below in the frame 7. Accordingly, in an exemplary embodiment of the present inventive concept, the attached elements are collectively called the frame 7 other than in an exceptional case.

Furthermore, a moving apparatus for inputting the fuel cell stack 5 in which a plurality of unit cells has been stacked into an activation task section or taking out the fuel cell stack 5 from the activation task section is installed in the frame 7.

The moving apparatus may include driving means (not illustrated) for providing forward and backward driving torque to the fuel cell stack 5, and a first guide rail 8 for guiding the fuel cell stack 5 to the activation task section.

Furthermore, cell terminals 9 (commonly called "SVM terminals" in the industry) (refer to FIG. 3) protruded from the plurality of unit cells are formed in the fuel cell stack 5. For example, the cell terminals 9 may be consecutively arranged at specific intervals at the lower part of the fuel cell stack 5.

Figure 3:
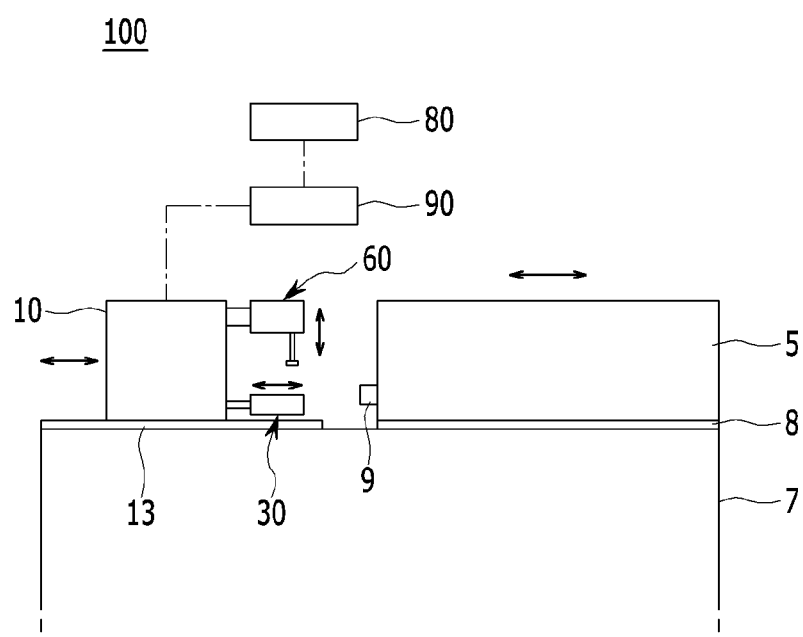
FIG. 3 is a block diagram schematically illustrating a connector connection assembly, which may be applied to the activation apparatus of fuel cell stacks in accordance with an exemplary embodiment of the present inventive concept.

FIG. 3 is a block diagram schematically illustrating a connector connection assembly, which may be applied to the activation apparatus of fuel cell stacks in accordance with an exemplary embodiment of the present inventive concept.

Referring to FIGS. 2A, 2B, and 3, in an exemplary embodiment of the present inventive concept, a connector connection assembly 100 is used to automatically connect cell voltage measurement equipment 2 for measuring the average cell voltage of unit cells that form the fuel cell stack 5 and the cell terminals 9 of the fuel cell stack 5.

The connector connection assembly 100 may basically include a first movable body 10, a terminal guide 30, and a connection unit 60.

In an exemplary embodiment of the present inventive concept, the first movable body 10 forms the terminal guide 30 and the connection unit 60 to be described in more detail later. The first movable body 10 is installed in such a way so as to reciprocate with respect to the fuel cell stack 5 that has entered the frame 7.

The first movable body 10 may be installed in such a way so as to reciprocate in the entry direction (i.e., horizontal direction) of the fuel cell stack 5 on the frame 7 with respect to the cell terminals 9 of the fuel cell stack 5 on the basis of the fuel cell stack 5 that has entered the frame 7.

That is, the first movable body 10 may be installed in such a way so as to reciprocate on the frame 7 in an electric-powered manner in the entry direction of the fuel cell stack 5 that enters the frame 7 through the first guide rail 8.

Figure 4:
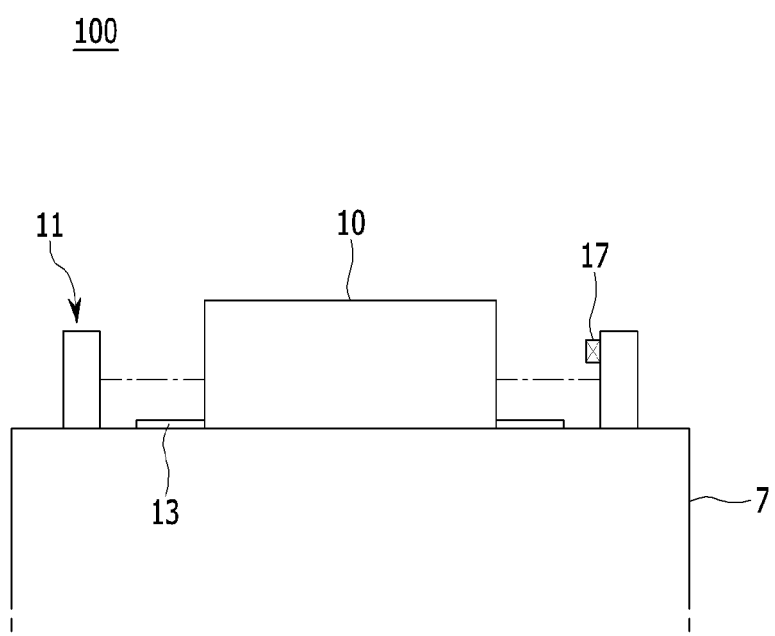
FIG. 4 is a diagram schematically illustrating a structure for driving the movable body of the connector connection assembly, which may be applied to the activation apparatus of fuel cell stacks in accordance with an exemplary embodiment of the present inventive concept.

As illustrated in FIG. 4, the first movable body 10 is installed so that it is moved by a first actuator 11 in such a way so as to reciprocate on the frame 7 in the entry direction of the fuel cell stack 5. The first movable body 10 may be installed in such a way so as to reciprocate in the entry direction of the fuel cell stack 5 along a second guide rail 13 placed on the frame 7.

The first actuator 11 may include a common cylinder apparatus for providing the first movable body 10 with the forward and backward driving torque of air pressure or hydraulic pressure, and may include a common movable apparatus for converting the torque of a motor into a straight-line reciprocal motion through a lead screw and an LM guide.

In this case, a proximity sensor 17 for limiting the location of a movement of the first movable body 10 may be installed in the frame 7.

The proximity sensor 17 is used to limit the forward location of the first movable body 10 with respect to the fuel cell stack 5. When the first movable body 10 reaches a predetermined location, the proximity sensor 17 detects the predetermined location and outputs a corresponding detection signal to a controller 90. Accordingly, the controller 90 may stop a movement of the first movable body 10 by applying a control signal to the first actuator 11.

Referring to FIG. 3, in an exemplary embodiment of the present inventive concept, the terminal guide 30 functions to support the cell terminals 9 of the fuel cell stack 5 that has entered the frame 7 as described above.

Figure 5:
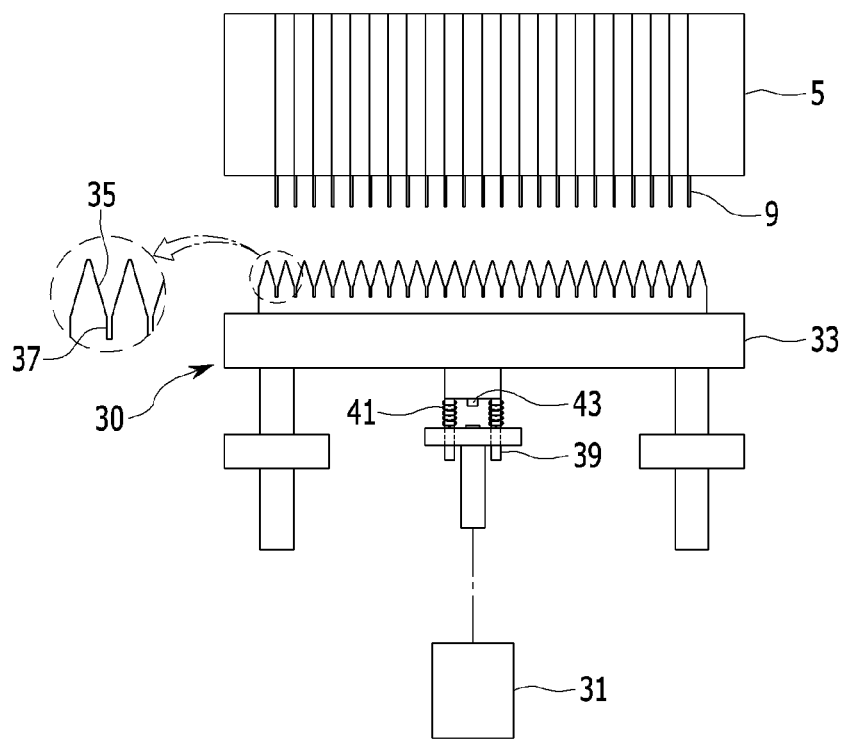
FIG. 5 is a diagram schematically illustrating the terminal guide of the connector connection assembly, which may be applied to the activation apparatus of fuel cell stacks in accordance with an exemplary embodiment of the present inventive concept.

FIG. 5 is a diagram schematically illustrating the terminal guide of the connector connection assembly, which may be applied to the activation apparatus of fuel cell stacks in accordance with an exemplary embodiment of the present inventive concept.

Referring to FIGS. 3 and 5, in an exemplary embodiment of the present inventive concept, the terminal guide 30 may be configured to reciprocate in the first movable body 10 with respect to the cell terminals 9 of the fuel cell stack 5.

The terminal guide 30 may include a guide block 33 installed in such a way so as to reciprocate in the direction horizontal to the first movable body 10 (i.e., in the entry direction of the fuel cell stack) through a second actuator 31.

The second actuator 31 may include a common cylinder apparatus for providing forward and backward driving torque of air pressure or hydraulic pressure to the guide block 33, and a common movable apparatus for converting the torque of a motor into a straight-line reciprocal motion through a lead screw and an LM guide.

"V"-shaped support grooves 35 for supporting the cell terminals 9 of the fuel cell stack 5 are formed in the guide block 33. Furthermore, insertion grooves 37 into which the cell terminals 9 are inserted are formed in the support grooves 35.

That is, when the second actuator 31 moves the guide block 33 to the cell terminals 9 of the fuel cell stack 5, the cell terminals 9 may be guided to the support grooves 35 of the guide block 33 and inserted into the insertion grooves 37.

In this case, the guide block 33 is installed in the connection stage of the second actuator 31 in such a way so as to move through a first guide bar 39. A buffer spring 41 for buffering the support pressure of the guide block 33 for the cell terminals 9 is installed in the first guide bar 39 between the guide block 33 and the connection stage of the second actuator 31.

Furthermore, a first rod cell 43 for detecting a contact with the connection stage of the second actuator 31 is installed in the guide block 33. The first rod cell 43 detects contact pressure between the connection stage of the second actuator 31 and the guide block 33 and outputs a corresponding detection signal to the controller 90.

That is, when the second actuator 31 moves the guide block 33 to the cell terminals 9 of the fuel cell stack 5, the first rod cell 43 buffers the support pressure of the guide block 33 for the cell terminals 9 through the buffer spring 41. When the connection stage of the second actuator 31 comes in contact with the guide block 33, the first rod cell 43 detects the contact and outputs a detection signal to the controller 90. Accordingly, the controller 90 may stop the operation of the second actuator 31 by applying a control signal to the second actuator 31.

Referring to FIG. 3, in an exemplary embodiment of the present inventive concept, the connection unit 60 comes in contact with the cell terminals 9 of the fuel cell stack 5, and is commonly called a "CVM connector" in the industry.

Figure 6:
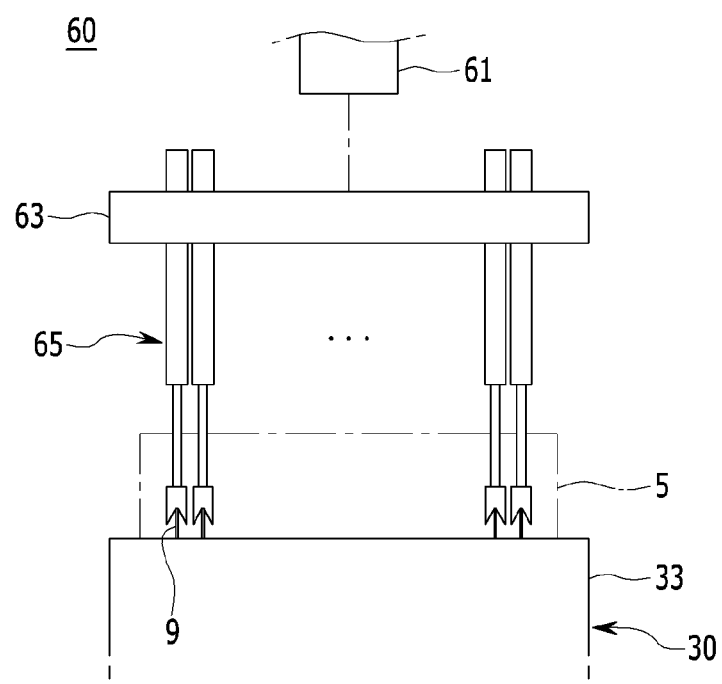
FIG. 6 is a diagram schematically illustrating the connection unit of the connector connection assembly, which may be applied to the activation apparatus of fuel cell stacks in accordance with an exemplary embodiment of the present inventive concept.

FIG. 6 is a diagram schematically illustrating the connection unit of the connector connection assembly, which may be applied to the activation apparatus of fuel cell stacks in accordance with an exemplary embodiment of the present inventive concept.

Referring to FIGS. 3 and 6, in an exemplary embodiment of the present inventive concept, the connection unit 60 may include a probe block 63 installed in the first movable body 10 so that it is reciprocated up and down by a third actuator 61.

That is, the probe block 63 may be moved downward by the third actuator 61 in the state in which the cell terminals 9 of the fuel cell stack 5 have been supported by the guide block 33 of the terminal guide 30.

The third actuator 61 is installed in the first movable body 10. The third actuator 61 may include a common actuation cylinder apparatus driven forward and backward by hydraulic pressure or air pressure, and is configured to reciprocate the probe block 63 up and down.

A plurality of connector probes 65 brought into contact with (or connected to) the cell terminals 9 arranged in the state in which the cell terminals 9 have been supported to the guide block 33 are installed in the probe block 63.

The connector probes 65 are consecutively arranged in the probe block 63 at specific intervals in accordance with the cell terminals 9 of the fuel cell stack 5. The connector probes 65 may be connected to the cell terminals 9 of the fuel cell stack 5 in a contact manner.

Figure 7:
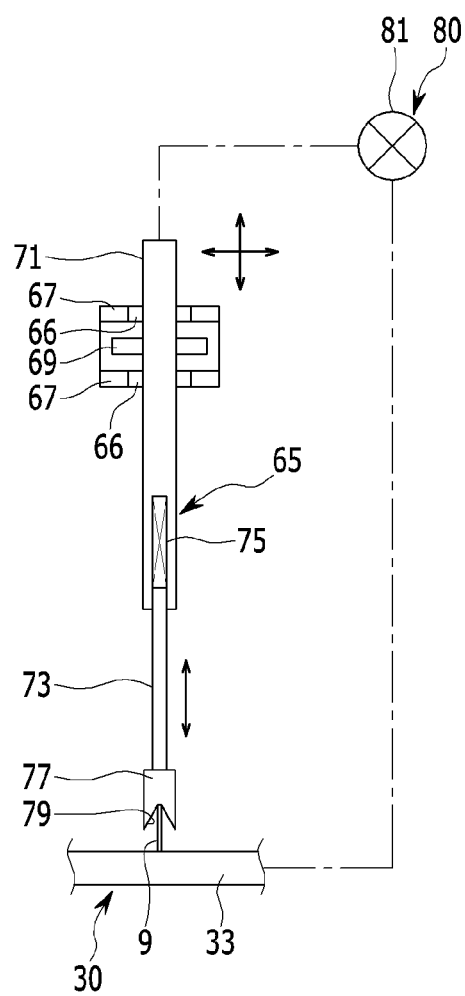
FIG. 7 is a diagram schematically illustrating the connector probe of the connection unit, which may be applied to the activation apparatus of fuel cell stacks in accordance with an exemplary embodiment of the present inventive concept.

FIG. 7 is a diagram schematically illustrating the connector probe of the connection unit, which may be applied to the activation apparatus of fuel cell stacks in accordance with an exemplary embodiment of the present inventive concept.

Referring to FIGS. 3, 6, and 7, in an exemplary embodiment of the present inventive concept, the connector probe 65 may be installed in the probe block 63 in such a way so as to move up and down and left and right.

To this end, the probe block 63 may include a mounting hole 66 configured to have a greater inside diameter than the outside diameter of the connector probe 65, and a pair of fixed plates 67 configured to support the connector probe 65 through the mounting hole 66.

Furthermore, a ring member 69 is fixedly installed in the connector probe 65. The ring member 69 is spaced apart from the fixed plates 67 at a specific interval and disposed between the pair of fixed plates 67.

That is, the connector probe 65 is supported to the mounting hole 66 of the fixed plate 67 having a greater diameter than the outside diameter of the connector probe 65, and the ring member 69 is installed between the pair of fixed plates 67. Accordingly, the connector probe 65 may be installed in the probe block 63 in such a way so as to move up and down and left and right (based on the drawing).

The reason for this is that, although the connector probes 65 are vertically placed on the cell terminals 9 at a predetermined tolerance or a location deviation, such that the cell terminals 9 are non-uniformly arranged, the cell terminals 9 and the connector probes 65 can be accurately connected because the connector probes 65 are allowed to move up and down and left and right.

In an exemplary embodiment of the present inventive concept, the connector probe 65 may include an outer shell member 71, a probe pin 73, a return spring 75, and a connector head 77.

The outer shell member 71 may be installed in the probe block 63 in such a way so as to move up and down and left and right. The probe pin 73 may be installed in such a way so as to move up and down within the outer shell member 71, and may be protruded to the outside of the outer shell member 71.

The return spring 75 provides a contact force to the cell terminals 9. The return spring 75 is installed within the outer shell member 71 and may apply an elastic force to the probe pin 73.

Furthermore, the connector head 77 substantially comes in contact with the cell terminals 9 of the fuel cell stack 5 and may be installed at the end of the probe pin 73 (i.e., at the bottom in the drawing).

In this case, "V"-shaped head grooves 79 for guiding (or supporting) the cell terminals 9 of the fuel cell stack 5 are formed in the connector heads 77.

That is, since the "V"-shaped head grooves 79 are formed in the connector heads 77, the connector probes 65 may allow the probe block 63 to move up and down and left and right as described above.

Referring to FIGS. 3 and 7, the connector connection assembly 100 in accordance with an exemplary embodiment of the present inventive concept may further include a display 80 for externally displaying an electrical connection between the cell terminals 9 of the fuel cell stack 5 and the connector probes 65.

In an exemplary embodiment of the present inventive concept, the display 80 may include an LED bulb 81 electrically connected to the connector probes 65 and the guide block 33 of the terminal guide 30 and configured to emit light (i.e., LED light) in response to an electrical signal.

In this case, the connector probes 65 and the guide block 33 may be made of conductive materials. When the connector probes 65 are connected to (or come in contact with) the cell terminals 9, the LED bulb 81 may be supplied with power and may display a connection state between each connector probe 65 and each cell terminal 9 using emitted light.

Furthermore, if the connector probes 65 and the cell terminals 9 are not normally brought in contact with each other (or connected) or a unit battery is defective, the LED bulb 81 is not supplied with power and does not emit light. Accordingly, the LED bulb 81 may externally display the failure state of a corresponding cell.

In another exemplary embodiment of the present inventive concept, as illustrated in FIGS. 2A, 2B, and 3, the activation apparatus includes the controller 90 for controlling an overall operation of the activation apparatus 1.

The controller 90 may receive the aforementioned detection signal from the proximity sensor 17 and control the driving of the first actuator 11, thus being capable of limiting the location of the first movable body 10 for the fuel cell stack 5.

Furthermore, when the connection stage of the second actuator 31 and the guide block 33 come in contact with each other as described above, the controller 90 may receive the detection signal of the first rod cell 43, that is, a result of the detection of the contact, and control the driving of the second actuator 31.

In addition, the controller 90 may reciprocate the probe block 63 up and down by controlling the third actuator 61 and may apply power to the LED bulb 81 of the display 80 when the connector probes 65 and the cell terminals 9 come in contact with each other.

Referring to FIGS. 2A and 2B, in an exemplary embodiment of the present inventive concept, the output cable connection assembly 200 functions to automatically connect positive (+) output cables 4a of electronic load equipment 4 to a side face on one side of the fuel cell stack 5 that has entered the frame 7.

Figure 8:
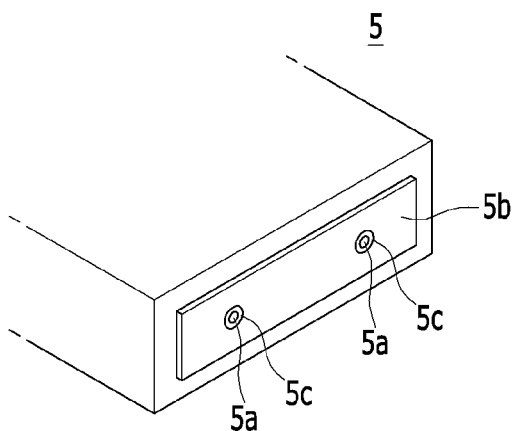
FIG. 8 is a diagram schematically illustrating a fuel cell stack, which may be applied to the activation apparatus of fuel cell stacks in accordance with an exemplary embodiment of the present inventive concept.
Figure 8:
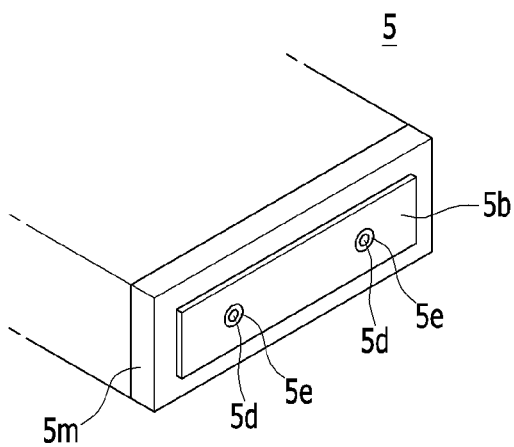

In this case, as illustrated in (a) of FIG. 8, the output cable connection assembly 200 can automatically connect the positive (+) output cables 4a of the electronic load equipment 4 (hereinafter refer to FIG. 2B) to positive (+) output terminals 5a provided in the side face on one side of the fuel cell stack 5.

The positive (+) output terminals 5a are provided in an end plate 5b provided on one side of the fuel cell stack 5. Terminal holes 5c are formed in the respective positive (+) output terminals 5a.

Figure 9:
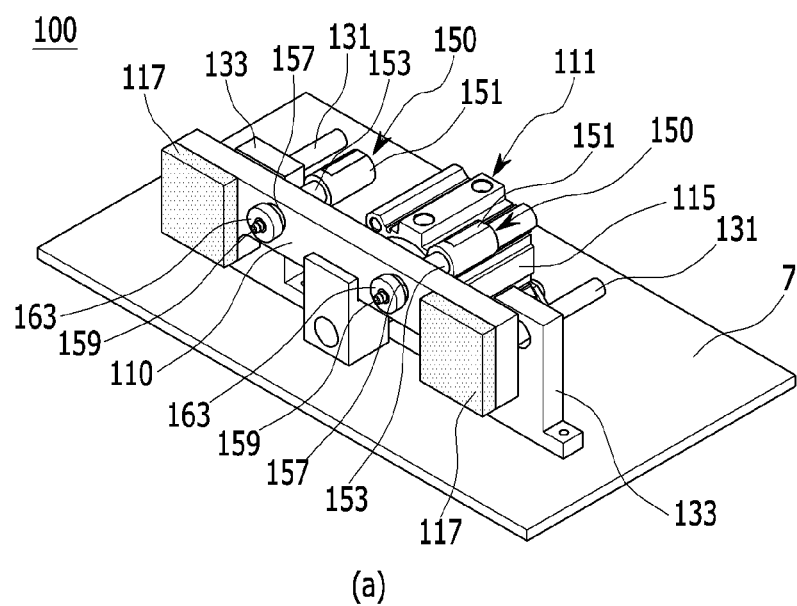
FIG. 9 is a perspective view illustrating an output cable connection assembly, which may be applied to the activation apparatus of fuel cell stacks in accordance with an exemplary embodiment of the present inventive concept.
Figure 9:
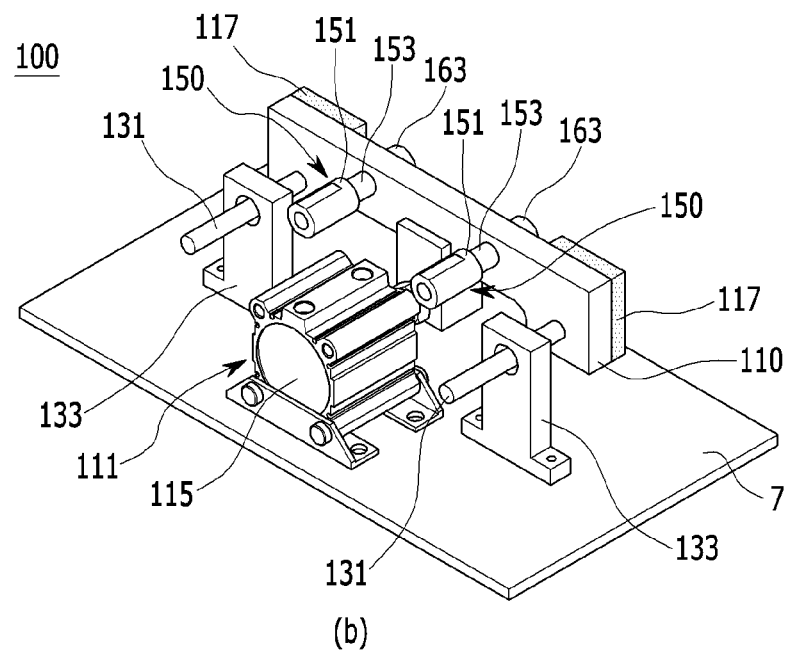

FIG. 9 is a perspective view illustrating the output cable connection assembly, which may be applied to the activation apparatus of fuel cell stacks in accordance with an exemplary embodiment of the present inventive concept.

Referring to FIGS. 2A, 2B, and 9, in an exemplary embodiment of the present inventive concept, the connector connection assembly 200 may basically include a second movable body 110 and a first connection terminal set 150.

The second movable body 110 forms the first connection terminal set 150 to be described in more detail, and may be installed in such a way so as to reciprocate with respect to the side face on one side of the fuel cell stack 5 that has entered the frame 7.

The second movable body 110 may be installed in such a way so as to reciprocate in a direction lateral to one side of the fuel cell stack 5 on the frame 7 with respect to the positive (+) output terminals 5a (hereinafter refer to (a) of FIG. 8) of the end plate 5b (hereinafter refer to (a) of FIG. 8) provided in the side face on one side of the fuel cell stack 5 on the basis of the fuel cell stack 5 that has entered the frame 7.

That is, the second movable body 110 may be installed in the frame 7 in such a way so as to reciprocate in an electric-powered manner in a direction lateral to one side of the fuel cell stack 5 that has entered the frame 7 through the first guide rail 8.

The second movable body 110 is installed in the frame 7 in such a way so as to reciprocate in the direction lateral to one side of the fuel cell stack 5 by a fourth actuator 111.

The fourth actuator 111 may include an actuation cylinder 115 for reciprocating the second movable body 110 in the direction lateral to one side of the fuel cell stack 5 by providing forward and backward driving forces to the second movable body 110. For example, the actuation cylinder 115 may include a pneumatic cylinder.

A pair of attachments 117 for supporting the side face on one side of the fuel cell stack 5 is installed in the second movable body 110. When the front surface of the second movable body 110 is closely attached to the side face on one side of the fuel cell stack 5 by the forward driving of the fourth actuator 111, the attachments 117 function to buffer the adhesion force of the second movable body 110.

The attachments 117 may be made of rubber materials in a block form, and may be fixedly installed on both sides of the front surface of the second movable body 110 in accordance with the side face on one side of the fuel cell stack 5.

Figure 10:
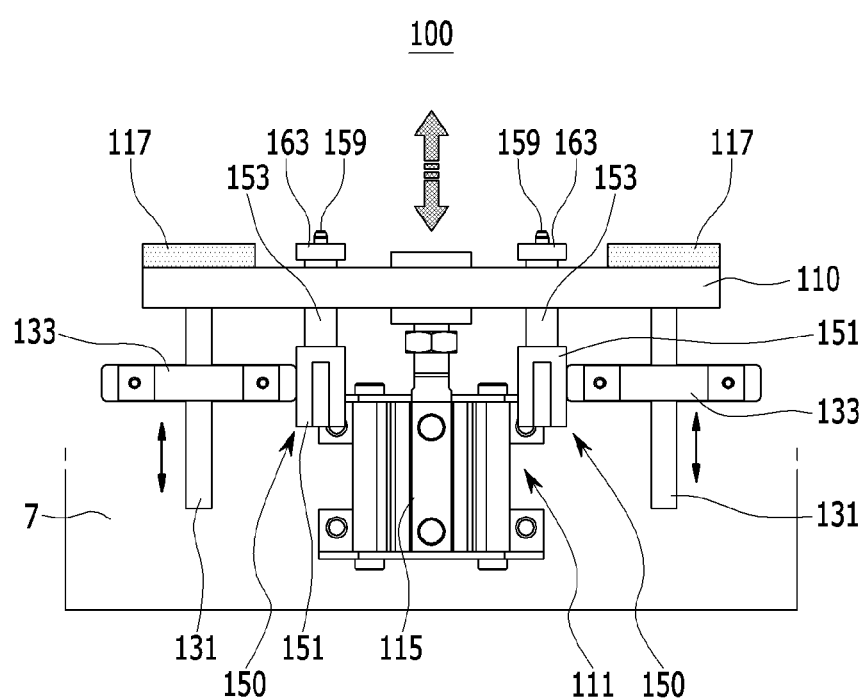
FIG. 10 is a diagram schematically illustrating a structure for driving the movable body of an output cable connection assembly, which may be applied to the activation apparatus of fuel cell stacks in accordance with an exemplary embodiment of the present inventive concept.

In this case, as illustrated in FIGS. 9 and 10, the second movable body 110 is connected to the actuation cylinder 115 of the fourth actuator 111 and is reciprocated in the direction lateral to one side of the fuel cell stack 5. The second movable body 110 is supported in such a way so as to reciprocate on the frame 7 through a pair of second guide bars 131.

The pair of second guide bars 131 are connected to the rear surface of the second movable body 110 and inserted into a pair of first support blocks 133 fixed on the frame 7. The pair of second guide bars 131 may guide a reciprocating motion of the second movable body 110.

Figure 11:
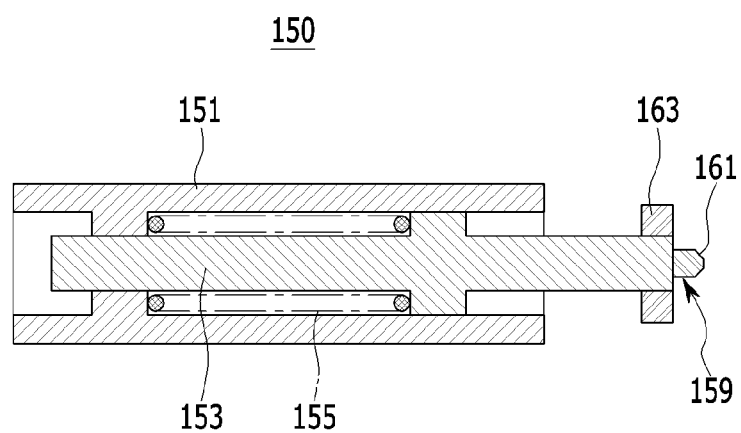
FIG. 11 is a diagram illustrating the first connection terminal set of the output cable connection assembly, which may be applied to the activation apparatus of fuel cell stacks in accordance with an exemplary embodiment of the present inventive concept.

FIG. 11 is a diagram illustrating the first connection terminal set of the output cable connection assembly, which may be applied to the activation apparatus of fuel cell stacks in accordance with an exemplary embodiment of the present inventive concept.

Referring to FIGS. 9 and 11, in an exemplary embodiment of the present inventive concept, the first connection terminal set 150 is electrically connected to the positive (+) output terminals 5a of the fuel cell stack 5 by the second movable body 110 that moves laterally to one side of the fuel cell stack 5.

The first connection terminal set 150 is elastically installed in the second movable body 110, and is electrically connected to the positive (+) output terminals 5a of the end plate 5b provided in the side face on one side of the fuel cell stack 5.

The first connection terminal set 150 may include first cable connection members 151 fixedly installed in the second movable body 110, first terminal rods 153 respectively installed in the first cable connection members 151, and first springs 155 respectively installed within the first cable connection members 151.

The first cable connection members 151 are configured in a cylinder shape, installed in the rear surface of the second movable body 110, and connected to the electronic load equipment 4 (refer to FIG. 2B) through the positive (+) output cables 4a.

Each of the first terminal rods 153 is protruded to the front surface of the second movable body 110 within the first cable connection member 151 and is installed in such a way so as to move in the direction lateral to one side of the fuel cell stack 5. That is, the first terminal rod 153 is installed so that it is protruded to the front surface of the second movable body 110 through a penetration hole 157 of the second movable body 110 within the first cable connection member 151.

First connection terminals 159 electrically connected to the respective positive (+) output terminals 5a of the fuel cell stack 5 are installed at the protruded ends of the first terminal rods 153. The first connection terminals 159 are respectively inserted into the terminal holes 5c of the positive (+) output terminals 5a. A tapered surface 161 is formed in the external circumference surface of each of the first connection terminals 159 so that the first connection terminal 159 is easily inserted into the terminal hole 5c of the positive (+) output terminal 5a.

A first support member 163 of a disk shape for supporting the positive (+) output terminal 5a of the fuel cell stack 5 is installed on the protruded end side of each of the first terminal rods 153. That is, the first support member 163 supports the positive (+) output terminal 5a of the end plate 5b when the first terminal rod 153 is inserted into the terminal hole 5c of the positive (+) output terminal 5a.

Furthermore, the first spring 155 is installed in the first terminal rod 153 within the first cable connection member 151. The first spring 155 supports the positive (+) output terminal 5a of the end plate 5b through the first support member 163 and applies an elastic force to the first terminal rod 153 when the first terminal rod 153 is inserted into the terminal hole 5c of the positive (+) output terminal 5a.

That is, the first terminal rod 153 may overcome the elastic force of the first spring 155, may move in the rear direction of the second movable body 110, and may apply the elastic force of the first spring 155 to the positive (+) output terminal 5a through the first connection terminal 159.

Referring back to FIGS. 2A and 2B, in an exemplary embodiment of the present inventive concept, the fluid supply pipe connection assembly 300 functions to automatically connect negative (−) output cables 4b of the electronic load equipment 4 to a side face on the other side of the fuel cell stack 5 that has entered the frame 7 and to automatically connect a fluid supply pipe 6a of fluid supply equipment 6 to the fuel cell stack 5.

In this case, as illustrated in (b) of FIG. 8, the fluid supply pipe connection assembly 300 can automatically connect the negative (−) output cables 4b of the electronic load equipment 4 (hereinafter refer to FIG. 2B) to negative (−) output terminals 5d provided in a side face on the other side of the fuel cell stack 5.

The negative (−) output terminals 5d are provided in the end plate 5b provided on the other side of the fuel cell stack 5. Terminal holes 5e are formed in the respective negative (−) output terminals 5d.

Furthermore, the fuel cell stack 5 may include a manifold 5m connected to the fluid supply pipe connection assembly 300 and configured to inject or exhaust hydrogen, air, and a coolant supplied through the fluid supply pipe 6a of the fluid supply equipment 6.

Figure 12:
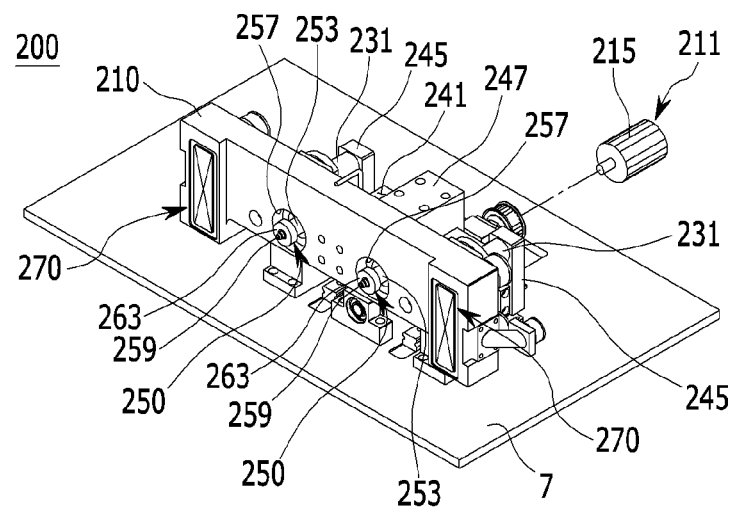
FIG. 12 is a perspective view illustrating a fluid supply pipe connection assembly, which may be applied to the activation apparatus of fuel cell stacks in accordance with an exemplary embodiment of the present inventive concept.
Figure 12:
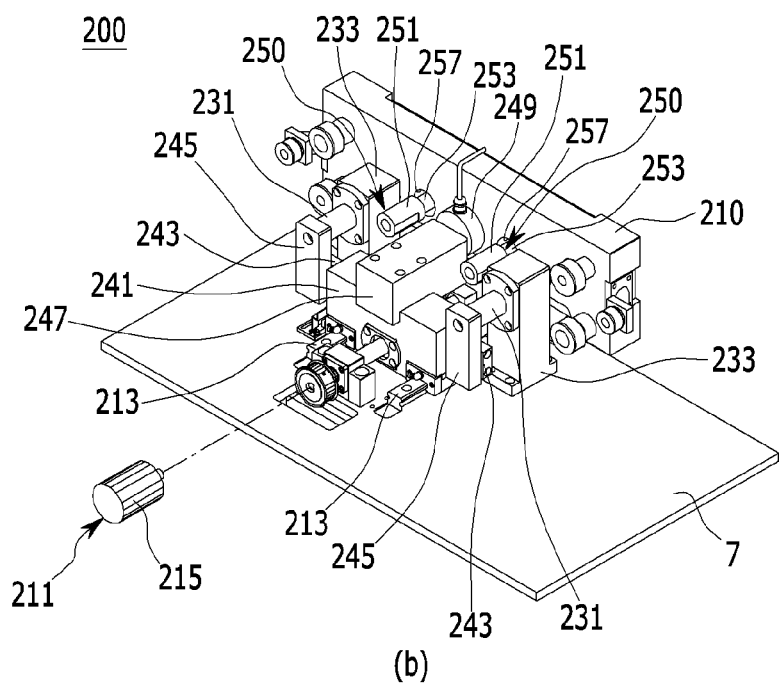

FIG. 12 is a perspective view illustrating the fluid supply pipe connection assembly, which may be applied to the activation apparatus of fuel cell stacks in accordance with an exemplary embodiment of the present inventive concept.

Referring to FIGS. 2A, 2B, and 12, in an exemplary embodiment of the present inventive concept, the fluid supply pipe connection assembly 300 may basically include a third movable body 210 and a second connection terminal set 250.

The third movable body 210 forms the second connection terminal set 250 to be described in more detail later, and is installed in such a way so as to reciprocate with respect to the side face on the other side of the fuel cell stack 5 that has entered the frame 7.

The third movable body 210 may be installed in such a way so as to reciprocate in the direction lateral to the other side of the fuel cell stack 5 on the frame 7 with respect to the negative (−) output terminals 5d (hereinafter refer to (b) of FIG. 8) of the end plate 5b, provided in the side face on the other side of the fuel cell stack 5, on the basis of the fuel cell stack 5 that has entered the frame 7.

That is, the third movable body 210 may be installed in the frame 7 in an electric-powered manner in such a way so as to reciprocate in a direction lateral to the other side of the fuel cell stack 5 that has entered the frame 7 through the first guide rail 8.

The third movable body 210 is installed in the frame 7 so that it is reciprocated by a fifth actuator 211 in the direction lateral to the other side of the fuel cell stack 5. The third movable body 210 may be installed in such a way so as to reciprocate in the direction lateral to the other side of the fuel cell stack 5 through third guide rails 213 placed on the frame 7.

The fifth actuator 211 may include a movable apparatus for converting the rotation motion of a motor 215 into a straight-line reciprocal motion through a lead screw and an LM guide.

Figure 13:
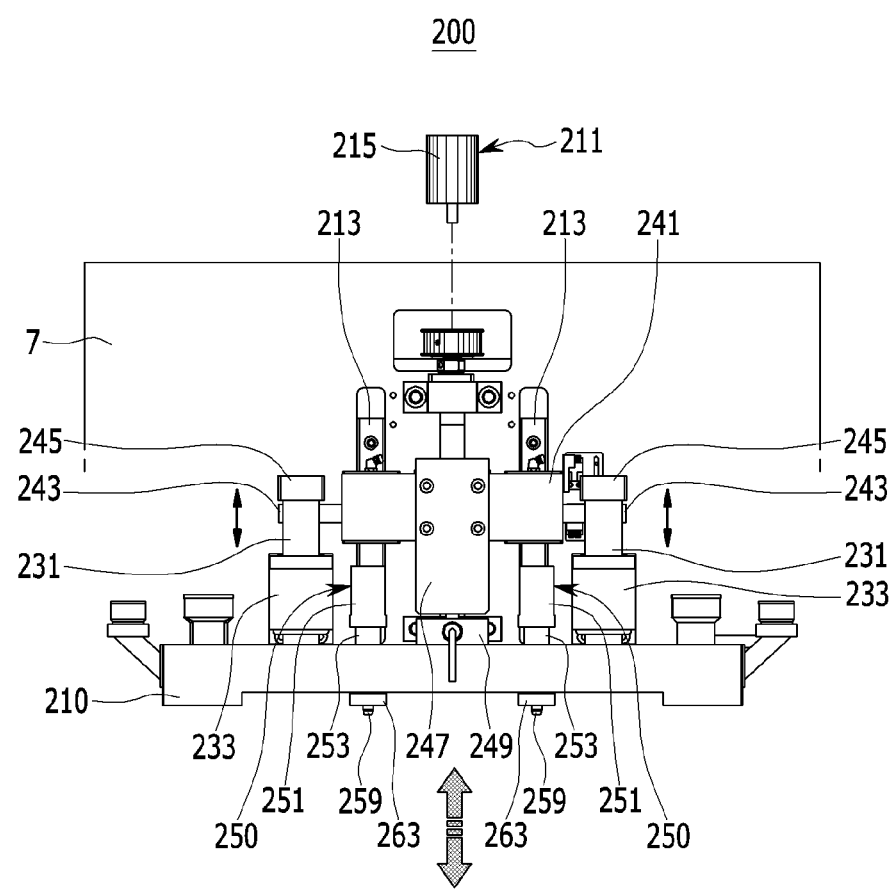
FIG. 13 is a diagram schematically illustrating a structure for driving the movable body of the fluid supply pipe connection assembly, which may be applied to the activation apparatus of fuel cell stacks in accordance with an exemplary embodiment of the present inventive concept.

In this case, as illustrated in FIG. 12 and FIG. 13, the third movable body 210 is installed in the frame 7 in such a way so as to reciprocate in the direction lateral to the other side of the fuel cell stack 5 through a pair of third guide bars 231. The third guide bars 231 are connected to the rear surface of the third movable body 210 and inserted into a pair of second support blocks 233 provided on the frame 7. The third guide bars 231 may guide a movement of the third movable body 210.

Furthermore, movable blocks 241 are installed in the frame 7 in accordance with the rear surface of the third movable body 210, and configured to reciprocate in the direction lateral to the other side of the fuel cell stack 5 by the fifth actuator 211. The movable blocks 241 are slidably connected to the third guide rails 213 in the direction lateral to the other side of the fuel cell stack 5.

In this case, stoppers 243 are integrally formed on both sides of the movable blocks 241 in such a way so as to be protruded. Furthermore, stopping blocks 245 engaged with the stoppers 243 are respectively formed at the ends of the third guide bars 231 in accordance with the stoppers 243.

Accordingly, when the fifth actuator 211 moves the movable blocks 241 backward from the side face on the other side of the fuel cell stack 5, the stoppers 243 may be engaged with the stopping blocks 245, thus being capable of moving the third movable body 210 backward.

A fixing block 247 toward the rear surface of the third movable body 210 may be fixedly installed in the movable blocks 241. When the fifth actuator 211 moves the movable blocks 241 forward in the direction of the other side of the fuel cell stack 5, the fixing block 247 supports the rear surface of the third movable body 210.

That is, when the fifth actuator 211 moves the movable blocks 241 forward in the direction lateral to the other side of the fuel cell stack 5, the fixing block 247 may move the third movable body 210 forward while pushing the third movable body 210.

Furthermore, a second rod cell 249 is installed in the rear surface of the third movable body 210 in accordance with the fixing block 247 and configured to come in contact with the fixing block 247. The second rod cell 249 functions to detect contact pressure with the fixing block 247 for the third movable body 210.

The second rod cell 249 detects contact pressure with the fixing block 247 and outputs a corresponding detection signal to the controller 90 (hereinafter refer to FIG. 2B).

When the fifth actuator 211 moves the movable blocks 241 forward and closely attaches the front surface of the third movable body 210 to the side face on the other side of the fuel cell stack 5 through the fixing block 247, the second rod cell 249 detects contact pressure with the fixing block 247 for the third movable body 210 and outputs a corresponding detection signal to the controller 90.

In response thereto, the controller 90 compares pressure applied to the side face on the other side of the fuel cell stack 5 with predetermined reference pressure. If the pressure applied to the side face on the other side of the fuel cell stack 5 is found to exceed the predetermined reference pressure, the controller 90 may stop the operation of the fifth actuator 211 by applying a control signal to the fifth actuator 211.

Figure 14:
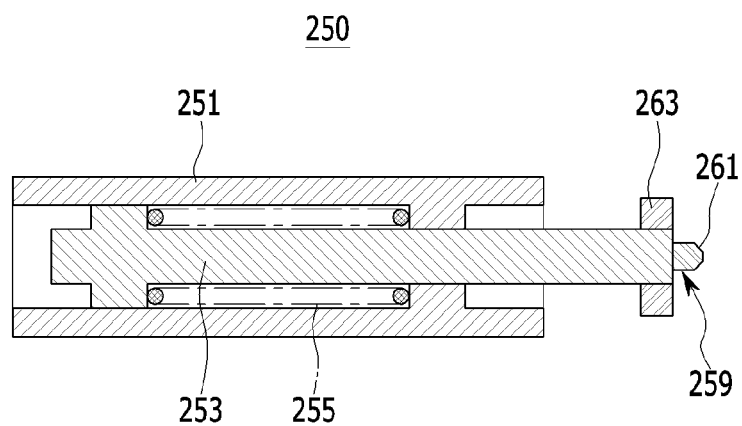
FIG. 14 is a diagram illustrating the second connection terminal set of the fluid supply pipe connection assembly, which may be applied to the activation apparatus of fuel cell stacks in accordance with an exemplary embodiment of the present inventive concept.

FIG. 14 is a diagram illustrating the second connection terminal set of the fluid supply pipe connection assembly, which may be applied to the activation apparatus of fuel cell stacks in accordance with an exemplary embodiment of the present inventive concept.

Referring to FIGS. 12 and 14, in an exemplary embodiment of the present inventive concept, the second connection terminal set 250 functions to connect the negative (−) output cables 4b of the electronic load equipment 4 (hereinafter refer to FIG. 2B) to the negative (−) output terminals 5d of the fuel cell stack 5 by the third movable body 210 that moves in the direction lateral to the other side of the fuel cell stack 5. The second connection terminal set 250 may be electrically connected to the negative (−) output terminals 5d of the fuel cell stack 5.

The second connection terminal set 250 is elastically installed in the third movable body 210 and is electrically connected to the negative (−) output terminals 5*d* of the end plate 5*b* provided in the side face on the other side of the fuel cell stack 5.

The second connection terminal set 250 may include second cable connection members 251 fixedly installed in the third movable body 210, second terminal rods 253 respectively installed in the second cable connection members 251, and second springs 255 respectively installed within the second cable connection members 251.

The second cable connection members 251 are configured in a cylinder shape, installed in the rear surface of the third movable body 210, and connected to the electronic load equipment 4 (refer to FIG. 2B) through the negative (−) output cable 4*b*.

The second terminal rods 253 are protruded toward the front surface of the third movable body 210 within the second cable connection members 251 and installed in such a way so as to move in the direction lateral to the other side of the fuel cell stack 5. That is, the second terminal rods 253 are installed in such a way so as to be protruded toward the front surface of the third movable body 210 through penetration holes 257 of the third movable body 210 within the second cable connection members 251.

Second connection terminals 259 are respectively installed at the protruded ends of the second terminal rods 253 and electrically connected to the negative (−) output terminals 5*d* of the fuel cell stack 5. The second connection terminals 259 are respectively inserted into the terminal holes 5*e* of the negative (−) output terminals 5*d*. A tapered surface 261 is formed in the external circumference surface of each of the second connection terminals 259 so that the second connection terminal 259 is easily inserted into the terminal hole 5*e* of the negative (−) output terminal 5*d*.

Second support members 263 of a disk shape are configured to respectively support the negative (−) output terminals 5*d* of the fuel cell stack 5, and are each installed on the protruded end side of the second terminal rod 253. That is, when the second terminal rod 253 is inserted into the terminal hole 5*e* of the negative (−) output terminal 5*d*, the second support member 263 supports the negative (−) output terminal 5*d* of the end plate 5*b*.

Furthermore, the second spring 255 is installed in the second terminal rod 253 within the second cable connection member 251. The second spring 255 supports the negative (−) output terminal 5*d* of the end plate 5*b* through the second support member 263. When the second terminal rod 253 is inserted into the terminal hole 5*e* of the negative (−) output terminal 5*d*, the second spring 255 applies an elastic force to the second terminal rod 253.

That is, the second terminal rod 253 may overcome the elastic force of the second spring 255, may move in the rear direction of the third movable body 210, and may apply the elastic force of the second spring 255 to the negative (−) output terminal 5*d* through the second connection terminal 259.

Referring to FIGS. 2A, 2B, and 12, in an exemplary embodiment of the present inventive concept, the fluid supply pipe connection assembly 300 may include a plurality of pipe connection assemblies 270 provided in the third movable body 210 and connected to the fluid supply pipe 6*a* of the fluid supply equipment 6.

The pipe connection assemblies 270 are connected to the manifold 5*m* (refer to (b) of FIG. 8) of the fuel cell stack 5, and are configured to include fluid supply/exhaust holes for supplying hydrogen, air, and a coolant to the manifold 5*m* of the fuel cell stack 5 and exhausting hydrogen, air, and a coolant from the fuel cell stack 5.

Figure 15:
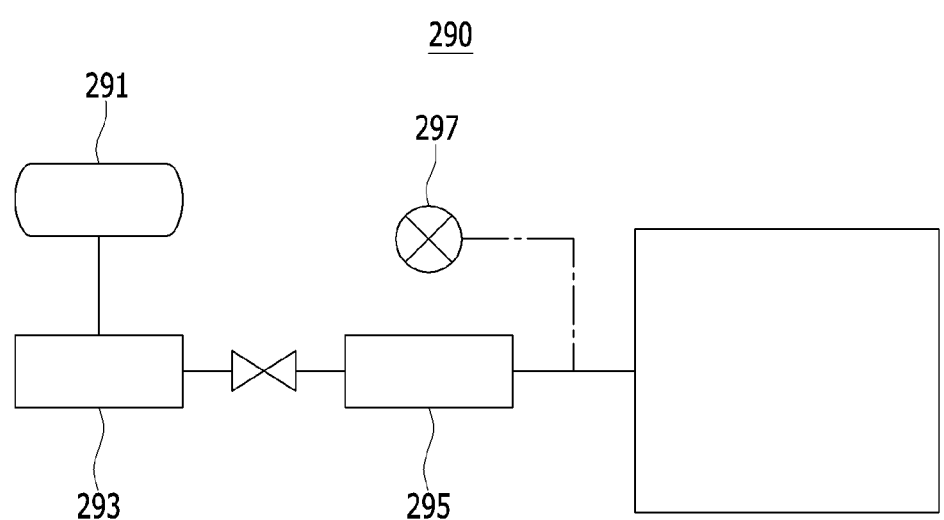
FIG. 15 is a diagram schematically illustrating the airtightness test unit of the fluid supply pipe connection assembly, which may be applied to the activation apparatus of fuel cell stacks in accordance with an exemplary embodiment of the present inventive concept.

The fluid supply pipe connection assembly 300 in accordance with an exemplary embodiment of the present inventive concept may further include an air-tightness test unit 290 for testing the air tightness of the fuel cell stack 5, as illustrated in FIG. 15.

The air-tightness test unit 290 connects the fluid supply pipe 6*a* of the fluid supply equipment 6 to the manifold 5*m* of the fuel cell stack 5 through the pipe connection assembly 270. The air-tightness test unit 290 functions to inject air into the fuel cell stack 5 through the pipe connection assembly 270 and test the air tightness of the fuel cell stack 5.

The air-tightness test unit 290 may include an air supply source 291 configured to supply air to the pipe connection assembly 270 of the third movable body 210, a pneumatic regulator 293 configured to control pressure of air supplied to the pipe connection assembly 270, a flowmeter 295 configured to measure the flow rate of supply air, and a pressure sensor 297 configured to detect pressure of air that acts within the fuel cell stack 5.

Accordingly, in an exemplary embodiment of the present inventive concept, in the state in which the fluid supply holes of the pipe connection assembly 270 are open and the fluid exhaust holes there are closed, air supplied by the air supply source 291 is injected into the fluid supply holes of the pipe connection assembly 270.

In this case, pressure of the air supplied by the air supply source 291 may be controlled to a predetermined pressure through the pneumatic regulator 293, the flow rate of the supplied air may be measured by the flowmeter 295, and the supply air may be controlled to a predetermined flow rate based on the measured value.

In addition, the pressure sensor 297 detects pressure of air that acts within the fuel cell stack 5, and outputs a corresponding detection signal to the controller 90 (refer to FIG. 2B). In response thereto, the controller 90 may compare the actual air pressure within the fuel cell stack 5 according to the detection signal with predetermined air pressure within the fuel cell stack 5 and determine whether the air tightness of the fuel cell stack 5 is normal.

Meanwhile, as illustrated in FIG. 2B, the activation apparatus 1 of fuel cell stacks in accordance with an exemplary embodiment of the present inventive concept may further include display means 400 for receiving a control signal from the controller 90 based on the average cell voltage of the fuel cell stack 5 measured by the cell voltage measurement equipment 2 and displaying whether the fuel cell stack 5 is normal.

For example, the controller 90 may compare the average cell voltage of the fuel cell stack 5, measured by the cell voltage measurement equipment 2, with a voltage reference value and display whether the fuel cell stack 5 is normal through the display means 400.

The operation of the activation apparatus 1 of fuel cell stacks configured as described above in accordance with an exemplary embodiment of the present inventive concept is described below with reference the aforementioned disclosed drawings.

In an exemplary embodiment of the present inventive concept, the fuel cell stack 5 in which a plurality of unit cells has been stacked is transferred through the carrier 3. An external appearance of the fuel cell stack 5 is tested, and fuel cell stacks 5 whose external appearances have been checked are transferred to the activation apparatuses 1 disposed in two channels through the transfer path 1*a*.

In this case, the fuel cell stack 5 enters the frame 7 of the apparatus 1, and enters a predetermined activation task section along the first guide rail 8 on the frame 7.

In an exemplary embodiment of the present inventive concept, in the state in which the fuel cell stack 5 has entered the activation task section as described above, the cell voltage measurement equipment 2 and the cell terminals 9 of the fuel cell stack 5 are automatically connected through the connector connection assembly 100.

More specifically, first, in an exemplary embodiment of the present inventive concept, the first movable body 10 may be moved forward in the entry direction of the fuel cell stack 5 through the first actuator 11.

In this case, the first movable body 10 is moved forward to the entry side of the fuel cell stack 5 along the second guide rail 13 on the frame 7. When the first movable body 10 reaches a predetermined location, the proximity sensor 17 detects it and outputs a corresponding detection signal to the controller 90. In response thereto, the controller 90 stops the movement of the first movable body 10 by applying a control signal to the first actuator 11.

In this state, in an exemplary embodiment of the present inventive concept, the second actuator 31 moves the guide block 33 of the terminal guide 30 forward to the part of the cell terminals 9 of the fuel cell stack 5.

When the second actuator 31 moves the guide block 33 to the part of the cell terminals 9 of the fuel cell stack 5, the cell terminals 9 are guided to the "V"-shaped support grooves 35 of the guide block 33 and inserted into the insertion grooves 37.

In this case, in an exemplary embodiment of the present inventive concept, when the second actuator 31 moves the guide block 33 to the part of the cell terminals 9 of the fuel cell stack 5, the buffer spring 41 may buffer support pressure of the guide block 33 for the cell terminals 9.

The second actuator 31 overcomes the elastic force of the buffer spring 41 and continues to move the guide block 33. When the guide block 33 comes in contact with the connection stage of the second actuator 31, in an exemplary embodiment of the present inventive concept, the first rod cell 43 detects the contact and outputs a corresponding detection signal to the controller 90. Accordingly, the controller 90 stops the operation of the second actuator 31 by applying a control signal to the second actuator 31.

In the state in which the cell terminals 9 of the fuel cell stack 5 have been supported through the guide block 33 of the terminal guide 30 as described above, in an exemplary embodiment of the present inventive concept, the third actuator 61 moves the probe block 63 of the connection unit 60 downward.

Accordingly, the plurality of connector probes 65 installed in the probe block 63 come in contact with the cell terminals 9 arranged in the state in which they are supported to the guide block 33. In this case, the connector probes 65 may be connected to the cell terminals 9 through the connector head 77 installed at the end of the probe pin 73.

In this process, in an exemplary embodiment of the present inventive concept, the connector probe 65 may be allowed to move up and down and left and right with respect to the probe block 63 because the connector probe 65 is supported through the mounting hole 66 of the fixed plate 67 having a greater diameter than the outside diameter of the connector probe 65 and the ring member 69 is fixedly installed in the connector probe 65 between the pair of fixed plates 67.

Accordingly, in an exemplary embodiment of the present inventive concept, although the connector probes 65 are placed in a direction vertical to the cell terminals 9 at a predetermined tolerance or a location deviation, such that the cell terminals 9 are non-uniformly arranged, the cell terminals 9 and the connector probes 65 can be accurately connected because the connector probes 65 are allowed to move up and down and left and right.

Furthermore, the contact force of the connector head 77 with the cell terminals 9 can be increased because the connector probes 65 elastically support the probe pin 73 through the return spring 75 within the outer shell member 71.

Furthermore, since the "V"-shaped head grooves 79 are formed in the connector head 77 of the connector probe 65, the cell terminals 9 can be supported through the head grooves 79. As described above, the connector probes 65 can be allowed to move up and down and left and right with respect to the probe block 63.

Through this process, in an exemplary embodiment of the present inventive concept, the output cable connection assembly 200 can automatically connect the positive (+) output cables 4a of the electronic load equipment 4 to the positive (+) output terminals 5a provided in the side face on one side of the fuel cell stack 5.

More specifically, first, in an exemplary embodiment of the present inventive concept, the fourth actuator 111 moves the second movable body 110 in the direction lateral to one side of the fuel cell stack 5.

In this case, the second movable body 110 may be guided through the second guide bars 131 inserted into the first support block 133 and moved in the direction lateral to one side of the fuel cell stack 5.

Accordingly, the front surface of the second movable body 110 is closely attached to the side face on one side of the fuel cell stack 5. The attachments 117 made of a rubber material support the side face on one side of the fuel cell stack 5. Accordingly, in an exemplary embodiment of the present inventive concept, the attachments 117 can buffer the close adhesion force of the second movable body 110 to the side face on one side of the fuel cell stack 5.

In an exemplary embodiment of the present inventive concept, when the front surface of the second movable body 110 is closely attached to the side face on one side of the fuel cell stack 5 as described above, the first terminal rods 153 of the first connection terminal set 150 overcome the elastic force of the first springs 155 and move in the rear direction of the second movable body 110 in the state in which they support the positive (+) output terminals 5a of the fuel cell stack 5 through the first support members 163.

In this case, the first connection terminals 159 of the first terminal rods 153 are inserted into the terminal holes 5c of the positive (+) output terminals 5a. Since the tapered surfaces 161 are formed in the outer circumference surfaces of the first connection terminals 159, the first connection terminals 159 can be easily inserted into the terminal holes 5c of the positive (+) output terminals 5a.

Furthermore, the first connection terminals 159 can be inserted into the terminal holes 5c of the positive (+) output terminals 5a with a strong close force and brought in surface contact therewith because the elastic forces of the first springs 155 are applied to the first terminal rods 153.

In this process, in an exemplary embodiment of the present inventive concept, the fluid supply pipe connection assembly 300 can automatically connect the negative (−) output cables 4b of the electronic load equipment 4 to the negative (−) output terminals 5d provided in the side face on the other side of the fuel cell stack 5 and automatically connect the fluid supply pipe 6a of the fluid supply equipment 6 to the manifold 5m of the fuel cell stack 5.

More specifically, in an exemplary embodiment of the present inventive concept, the fifth actuator 211 moves the movable blocks 241 forward in the direction lateral to the other side of the fuel cell stack 5 along the third guide rails 213.

Accordingly, the fixing block 247 fixed to the movable blocks 241 comes in contact with the second rod cell 249, pushes the third movable body 210, and moves the third movable body 210 forward in the direction lateral to the other side of the fuel cell stack 5.

In this case, the third movable body 210 may be guided through the pair of third guide bars 231 inserted into the second support blocks 233, and may be moved in the direction lateral to the other side of the fuel cell stack 5.

If the third movable body 210 is to be moved backward from the side face on the other side of the fuel cell stack 5, the fifth actuator 211 moves the movable blocks 241 backward from the side face on the other side of the fuel cell stack 5. Accordingly, the stoppers 243 provided in the movable blocks 241 are engaged with the stopping blocks 245 of the third guide bars 231, thereby being capable of moving the third movable body 210 backward.

When the third movable body 210 is moved forward and the front surface of the third movable body 210 is closely attached to the side face on the other side of the fuel cell stack 5 as described above, the fixing block 247 pressurizes the second rod cell 249.

Accordingly, the second rod cell 249 detects contact pressure of the fixing block 247 with the third movable body 210 and outputs a corresponding detection signal to the controller 90.

In response thereto, the controller 90 compares pressure applied to the side face on the other side of the fuel cell stack 5 with predetermined reference pressure. If the pressure applied to the side face on the other side of the fuel cell stack 5 is found to exceed the predetermined reference pressure, the controller 90 may stop the operation of the fifth actuator 211 by applying a control signal to the fifth actuator 211.

In an exemplary embodiment of the present inventive concept, when the front surface of the third movable body 210 is closely attached to the side face on the other side of the fuel cell stack 5 as described above, the second terminal rods 253 of the second connection terminal set 250 overcome the elastic forces of the second springs 255 and move in the rear direction of the third movable body 210 in the state in which support the negative (−) output terminals 5d of the fuel cell stack 5 through the second support members 263.

In this case, the second connection terminals 259 provided in the second terminal rods 253 are inserted into the terminal holes 5e of the negative (−) output terminals 5d. Since the tapered surfaces 261 are respectively formed in the outer circumference surfaces of the second connection terminals 259, the second connection terminals 259 may be easily inserted into the respective terminal holes 5e of the negative (−) output terminals 5d.

Furthermore, since the elastic forces of the second springs 255 are applied to the second terminal rod 253, the second connection terminals 259 may be inserted into the terminal holes 5e of the negative (−) output terminals 5d and brought in surface contact thereto with strong close adhesion forces.

As described above, at the same time as when the second connection terminals 259 of the second connection terminal set 250 are connected to the negative (−) output terminals 5d of the fuel cell stack 5, the pipe connection assembly 270 of the third movable body 210 may be connected to the manifold 5m of the fuel cell stack 5.

In an exemplary embodiment of the present inventive concept, after the fluid supply pipe 6a of the fluid supply equipment 6 is connected to the manifold 5m of the fuel cell stack 5 through the pipe connection assembly 270 as described above, air supplied by the air supply source 291 of the air-tightness test unit 290 is injected into the fluid supply holes of the pipe connection assembly 270.

In this case, pressure of the air supplied by the air supply source 291 may be controlled to predetermined pressure by the pneumatic regulator 293. The flow rate of the supplied air is measured by the flowmeter 295 so that it may be controlled to a predetermined flow rate based on the measured value.

Furthermore, the pressure sensor 297 of the air-tightness test unit 290 detects pressure of the air that acts within the fuel cell stack 5 and outputs a corresponding detection signal to the controller 90. In response thereto, the controller 90 may compare the actual air pressure within the fuel cell stack 5 according to the detection signal with predetermined air pressure within the fuel cell stack 5 and determine whether the air tightness of the fuel cell stack 5 is normal.

In an exemplary embodiment of the present inventive concept, as described above, the cell voltage measurement equipment 2 for measuring the average cell voltage of the fuel cell stack 5 and the cell terminals 9 of the fuel cell stack 5 can be automatically connected through the connector connection assembly 100.

Furthermore, in an exemplary embodiment of the present inventive concept, the positive (+) output cables 4a of the electronic load equipment 4 can be automatically connected to the positive (+) output terminals 5a provided in the side face on one side of the fuel cell stack 5 through the output cable connection assembly 200.

In addition, in an exemplary embodiment of the present inventive concept, the fluid supply pipe connection assembly 300 can automatically connect the negative (−) output cables 4b of the electronic load equipment 4 to the negative (−) output terminals 5d provided in the side face on the other side of the fuel cell stack 5 and automatically connect the fluid supply pipe 6a of the fluid supply equipment 6 to the manifold 5m of the fuel cell stack 5.

In this state, in an exemplary embodiment of the present inventive concept, hydrogen, air, and a coolant supplied through the fluid supply pipe 6a of the fluid supply equipment 6 are supplied to the fuel cell stack 5 through the pipe connection assembly 270 of the fluid supply pipe connection assembly 300.

Accordingly, the fuel cell stack 5 generates electrical energy by an electrochemical reaction of hydrogen and air. The electrical energy is applied to the electronic load equipment 4 through the positive (+) output terminals 5a of the fuel cell stack 5 and the positive (+) output cables 4a which are electrically connected by the output cable connection assembly 200 and the negative (−) output terminals 5d of the fuel cell stack 5 and the negative (−) output cable 4b which are electrically connected by the fluid supply pipe connection assembly 300.

In an exemplary embodiment of the present inventive concept, while the electrical energy generated by the fuel cell stack 5 is applied to the electronic load equipment 4 as described above, the state in which the connector probes 65 of the connector connection assembly 100 and the cell terminals 9 of the fuel cell stack 5 are connected can be externally displayed through the display 80.

That is, in an exemplary embodiment of the present inventive concept, the connector probes 65, the guide block 33, and the display 80 are electrically connected, and power is supplied to the display 80 through the controller 90.

Accordingly, the LED bulb 81 of the display 80 can emit light.

If the connector probes 65 and the cell terminals 9 are not normally brought in contact with each other (or connected) or a unit battery is defective, power is not supplied to the LED bulb 81 of the display 80. Accordingly, the state in which a corresponding cell is defective can be externally displayed.

Accordingly, in an exemplary embodiment of the present inventive concept, whether the connector probes 65 are respectively connected to the cell terminals 9 can be displayed using light generated by the LED bulb 81 of the display 80.

In an exemplary embodiment of the present inventive concept, when the cell voltage measurement equipment 2 is connected to the cell terminals 9 of the fuel cell stack 5 through the connector connection assembly 100, the cell voltage measurement equipment 2 can measure the average cell voltage of the fuel cell stack 5.

The measured value of the average cell voltage of the fuel cell stack 5 measured by the cell voltage measurement equipment 2 as described above is transmitted to the controller 90. The controller 90 may compare the average cell voltage of the fuel cell stack 5, measured by the cell voltage measurement equipment 2, with a voltage reference value, may determine whether the fuel cell stack 5 is normal, and may display whether the fuel cell stack 5 is normal through the display means 400.

In accordance with the activation apparatus 1 of fuel cell stacks according to an exemplary embodiment of the present inventive concept, activation and performance evaluation processes for the fuel cell stack 5 can be unmanned and automatically implemented through the connector connection assembly 100, the output cable connection assembly 200, and the fluid supply pipe connection assembly 300 in a multiple channel manner.

Furthermore, in an exemplary embodiment of the present inventive concept, an automatic assembly mass-production process for a fuel cell vehicle can be flexibly handled because the voltage measurement connector, the output cable, and the fluid supply pipe for the fuel cell stack 5 can be simultaneously connected through an automation process.

In addition, in an exemplary embodiment of the present inventive concept, since the voltage measurement connector, the output cable, and the fluid supply pipe for the fuel cell stack 5 can be simultaneously connected through an automation process, the workability of a fuel cell stack activation process can be improved, damage to a fuel cell stack and an electric shock accident of a worker can be prevented, and air-tightness with a fuel cell stack when a fluid is supplied can be secured.

Although the exemplary embodiments of the present inventive concept have been described above, the technical spirit of the present inventive concept is not limited to the exemplary embodiments proposed in this specification. Those skilled in the art who understand the technical spirit of the present inventive concept may easily propose other exemplary embodiments by supplementing, changing, deleting, and adding constituent elements within a range of the same technical spirit. However, those supplements, changes, deletions, and additions may be construed as falling within the range of the present inventive concept.

What is claimed is:

1. An activation apparatus of fuel cell stacks for automatically performing activation and performance evaluation processes on the fuel cell stacks in a state in which the fuel cell stacks have entered a frame, the activation apparatus comprising:
    a connector connection assembly installed in the frame in an electric-powered manner to reciprocate in an entry direction of the fuel cell stack and configured to connect a plurality of connector probes to cell terminals of the fuel cell stack;
    an output cable connection assembly installed in the frame in an electric-powered manner to reciprocate in a direction lateral to a first side of the fuel cell stack and configured to connect positive (+) output cables to the first side of the fuel cell stack; and
    a fluid supply pipe connection assembly installed in the frame in an electric-powered manner to reciprocate in a direction lateral to a second side of the fuel cell stack and configured to connect negative (−) output cables to the second side of the fuel cell stack and to connect a fluid supply pipe to a manifold of the fuel cell stack, wherein
    cell voltage measurement equipment and the cell terminals of the fuel cell stack are automatically connected by the connector connection assembly;
    output cables of electronic load equipment are automatically connected to output terminals of the fuel cell stack through the output cable connection assembly and the fluid supply pipe connection assembly; and
    the fluid supply pipe of fluid supply equipment is automatically connected to the manifold of the fuel cell stack through the fluid supply pipe connection assembly.

2. The activation apparatus of claim 1, wherein the activation and performance evaluation processes are automatically performed on at least two fuel cell stacks disposed in at least two channels after the fuel cell stacks are transferred through a carrier and an external appearance test is performed on the fuel cell stacks.

3. The activation apparatus of claim 2, wherein a plurality of the activation apparatuses are spaced apart from each other with a transfer path of the fuel cell stacks interposed between the activation apparatuses.

4. The activation apparatus of claim 1, wherein:
    hydrogen and air are supplied to unit cells of the fuel cell stack through the fluid supply pipe;
    electrical energy generated by the unit cells is applied to the electronic load equipment through the output cable; and
    cell voltages of the unit cells applied to the electronic load equipment are measured by the cell voltage measurement equipment.

5. The activation apparatus of claim 1, wherein the connector connection assembly comprises:
    a first movable body installed in the frame to reciprocate in the entry direction of the fuel cell stack through a first actuator;
    a proximity sensor installed in the frame and configured to limit a movement location of the first movable body;
    a terminal guide installed in the first movable body to reciprocate with respect to the cell terminals of the fuel cell stack and configured to support the cell terminals; and
    a connection unit configured to comprise connector probes connected to the cell terminals arranged in the terminal guide and installed in the first movable body to reciprocate.

6. The activation apparatus of claim 5, wherein:
the terminal guide comprises a guide block installed in the first movable body to be reciprocated by a second actuator in the entry direction of the fuel cell stack;
"V"-shaped grooves for supporting the cell terminals are formed in the guide block; and
insertion grooves into which the cell terminals are respectively inserted are formed in the support grooves.

7. The activation apparatus of claim 6, wherein:
the guide block is installed in a connection stage of the second actuator to move through the first guide bar;
a buffer spring for buffering support pressure on the cell terminals is installed in the first guide bar between the guide block and the connection stage of the second actuator; and
a first rod cell for detecting a contact with the connection stage of the second actuator is installed in the guide block.

8. The activation apparatus of claim 5, wherein:
the connection unit comprises a probe block installed in the first movable body to reciprocate up and down through a third actuator;
the connector probes brought in contact with the cell terminals are consecutively arranged in the probe block, the probe block comprises mounting holes each having a greater inside diameter than an outside diameter of the connector probe, and a pair of fixed plates for supporting each of the connector probes are installed in the probe block through the mounting hole; and
a ring member is fixedly installed in the connector probe, wherein the ring member is spaced apart from the fixed plates at a specific interval and disposed between the fixed plates.

9. The activation apparatus of claim 8, wherein each of the connector probes comprises:
an outer shell member installed in the probe block;
a probe pin installed within the outer shell member in such a way so as to move up and down;
a return spring installed in the outer shell member and configured to apply an elastic force to the probe pin; and
a connector head installed in the probe pin and configured to come in contact with each of the cell terminals and to have a "V"-shaped head groove supporting the cell terminal.

10. The activation apparatus of claim 1, wherein the output cable connection assembly comprises:
a second movable body installed in the frame to reciprocate in the direction lateral to the side face on the first side of the fuel cell stack direction through a fourth actuator; and
a pair of first connection terminal sets elastically installed in the second movable body and connected to positive (+) output terminals of the fuel cell stack.

11. The activation apparatus of claim 10, wherein a pair of attachments for supporting the side face on the first side of the fuel cell stack are installed in the second movable body.

12. The activation apparatus of claim 10, wherein each of the first connection terminal sets comprises:
a first cable connection member fixedly installed in the second movable body and connected to electronic load equipment through the positive (+) output cables;
a first terminal rod protruded from an inside of the first cable connection member to an outside, installed to move in the direction lateral to the side face on the first side of the fuel cell stack, and configured to have a first connection terminal installed at the protruded end of the first terminal rod; and
a first spring installed within the first cable connection member and configured to apply an elastic force to the first terminal rod.

13. The activation apparatus of claim 12, wherein the first connection terminal is inserted into each of terminal holes provided in a side face on the first side of the fuel cell stack and configured to form an outer circumference of a tapered shape.

14. The activation apparatus of claim 10, wherein the fourth actuator comprises an actuation cylinder connected to the second movable body.

15. The activation apparatus of claim 14, wherein:
the second movable body is installed in the frame to reciprocate through a pair of second guide bars; and
the pair of second guide bars are inserted into a pair of first support blocks provided in the frame and configured to guide a movement of the second movable body.

16. The activation apparatus of claim 1, wherein the fluid supply pipe connection assembly comprises:
a third movable body installed in the frame to reciprocate in the direction lateral to the second side of the fuel cell stack through a fifth actuator,
a pair of second connection terminal sets elastically installed in the third movable body and connected to negative (−) output terminals of the fuel cell stack, and
a plurality of pipe connection assemblies provided in the third movable body and connected to the fluid supply pipe of fluid supply equipment.

17. The activation apparatus of claim 16, wherein each of the second connection terminal sets comprises:
a second cable connection member fixedly installed in the third movable body and connected to electronic load equipment through the negative (−) output cables;
a second terminal rod protruded from an inside of the second cable connection member to an outside, installed to move in the direction lateral to the second side of the fuel cell stack, and configured to have a second connection terminal installed at the protruded end of the second terminal rod; and
a second spring installed within the second cable connection member and configured to apply an elastic force to the second terminal rod.

18. The activation apparatus of claim 17, wherein the second connection terminal is inserted into each of terminal holes provided in a side face on the second side of the fuel cell stack and configured to form an outer circumference of a tapered shape.

19. The activation apparatus of claim 16, wherein:
the third movable body is installed in the frame in such a way so as to reciprocate through a pair of third guide bars, and the third guide bars are inserted into a pair of second support blocks provided on the frame;
movable blocks reciprocated by the fifth actuator in the direction lateral to the second side of the fuel cell stack are installed in the frame, and stoppers are respectively formed on both sides of the movable blocks to be protruded; and
stopping blocks engaged with the stoppers are respectively installed in the third guide bars.

20. The activation apparatus of claim 19, wherein:
a fixing block is fixedly installed in the movable blocks; and
a second rod cell brought in contact with the fixing block is installed in the third movable body.

21. The activation apparatus of claim 16, wherein the fluid supply pipe connection assembly further comprises an air-tightness test unit configured to test air-tightness of the fuel cell stack.

22. The activation apparatus of claim 21, wherein the air-tightness test unit comprises:

an air supply source configured to supply air to the pipe connection assembly;

a pneumatic regulator configured to control pressure of the air supplied to the pipe connection assembly;

a flowmeter configured to measure a flow rate of the supplied air; and a pressure sensor configured to detect pressure of air which acts within the fuel cell stack.

23. The activation apparatus of claim 1, further comprising:

cell voltage measurement equipment electrically connected to the connector connection assembly and configured to test an average cell voltage of the fuel cell stack; and display means connected to the cell voltage measurement equipment and configured to receive a control signal from a controller based on the average cell voltage of the fuel cell stack and to display whether the fuel cell stack is normal.

24. The activation apparatus of claim 5, wherein the connector connection assembly comprises a display electrically connected to the connector probes and the terminal guides and configured to externally display electrical connection between the cell terminals and the connector probes.

25. The activation apparatus of claim 24, wherein the display comprises an LED bulb configured to emit light in response to an electrical signal.

* * * * *